US010046306B2

(12) United States Patent
Romig et al.

(10) Patent No.: US 10,046,306 B2
(45) Date of Patent: *Aug. 14, 2018

(54) TREATER REGENERATION

(71) Applicant: Chevron Phillips Chemical Company LP, The Woodlands, TX (US)

(72) Inventors: Ralph W. Romig, Kingwood, TX (US); Timothy O. Odi, Kingwood, TX (US); Jennifer F. Drew, Humble, TX (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/822,633

(22) Filed: Nov. 27, 2017

(65) Prior Publication Data
US 2018/0078921 A1  Mar. 22, 2018

Related U.S. Application Data

(63) Continuation of application No. 15/585,987, filed on May 3, 2017, now Pat. No. 9,861,955, which is a continuation-in-part of application No. 15/044,222, filed on Feb. 16, 2016, now Pat. No. 9,687,815, which is a continuation of application No. 14/737,335, filed on Jun. 11, 2015, now Pat. No. 9,289,748.

(51) Int. Cl.
| B01D 53/04 | (2006.01) |
| B01J 20/34 | (2006.01) |
| B01D 53/26 | (2006.01) |
| C08F 10/00 | (2006.01) |
| B01D 53/047 | (2006.01) |

(52) U.S. Cl.
CPC ...... *B01J 20/3458* (2013.01); *B01D 53/0438* (2013.01); *B01D 53/0462* (2013.01); *B01D 53/261* (2013.01); *B01J 20/3408* (2013.01); *B01J 20/3433* (2013.01); *C08F 10/00* (2013.01); *B01D 53/047* (2013.01); *B01D 2253/104* (2013.01); *B01D 2253/108* (2013.01); *B01D 2256/24* (2013.01); *B01D 2257/104* (2013.01); *B01D 2257/30* (2013.01); *B01D 2257/504* (2013.01); *B01D 2257/70* (2013.01); *B01D 2257/7022* (2013.01); *B01D 2257/80* (2013.01); *B01D 2259/402* (2013.01); *B01D 2259/4009* (2013.01); *B01D 2259/40052* (2013.01); *Y02C 10/08* (2013.01)

(58) Field of Classification Search
CPC .. B01D 53/04; B01D 53/0438; B01J 20/3458; C08F 10/00
USPC ......................................................... 502/36
See application file for complete search history.

(56) References Cited

U.S. PATENT DOCUMENTS

| 2,625,915 | A | 1/1953 | Glasgow et al. |
| 2,906,793 | A | 9/1959 | Rowe et al. |
| 3,061,601 | A | 10/1962 | Watt |
| 3,248,179 | A | 4/1966 | Norwood |
| 3,384,601 | A | 5/1968 | Price |
| 3,502,638 | A | 3/1970 | Ratzsch et al. |
| 3,585,971 | A | 6/1971 | Muckelrath |
| 4,212,847 | A | 7/1980 | Volmer et al. |
| 4,501,885 | A | 2/1985 | Sherk et al. |
| 5,028,670 | A | 7/1991 | Chinh et al. |
| 5,470,925 | A | 11/1995 | Ramachandran et al. |
| 5,534,607 | A | 7/1996 | Martens et al. |
| 5,565,175 | A | 10/1996 | Hottovy et al. |
| 5,575,979 | A | 11/1996 | Hanson |
| 5,958,109 | A | 9/1999 | Fuderer |
| 6,096,840 | A | 8/2000 | Bernier et al. |
| 6,239,235 | B1 | 5/2001 | Hottovy et al. |
| 6,262,191 | B1 | 7/2001 | Hottovy et al. |
| 6,355,594 | B1 | 3/2002 | McDaniel et al. |
| 6,376,415 | B1 | 4/2002 | McDaniel et al. |
| 6,395,666 | B1 | 5/2002 | McDaniel et al. |
| 6,511,936 | B1 | 1/2003 | Theopold et al. |
| 6,524,987 | B1 | 2/2003 | Collins et al. |
| 6,528,448 | B1 | 3/2003 | Jensen et al. |
| 6,531,565 | B2 | 3/2003 | Kellum et al. |
| 6,534,609 | B2 | 3/2003 | Mitchell et al. |
| 6,828,268 | B1 | 12/2004 | McDaniel et al. |
| 6,833,415 | B2 | 12/2004 | Kendrick et al. |
| 6,852,660 | B2 | 2/2005 | Mitchell et al. |
| 6,911,505 | B2 | 6/2005 | Small |
| 6,911,506 | B2 | 6/2005 | Small et al. |
| 6,936,667 | B2 | 8/2005 | Jensen et al. |
| 6,977,235 | B2 | 12/2005 | McDaniel et al. |

(Continued)

FOREIGN PATENT DOCUMENTS

| EP | 0200518 A2 | 11/1986 |
| EP | 1491559 A1 | 12/2004 |

(Continued)

OTHER PUBLICATIONS

Foreign communication from a related counterpart application—International Search Report and Written opinion, PCT/US2016/036639, dated Oct. 18, 2016 (15 pages).

(Continued)

*Primary Examiner* — Edward M Johnson
(74) *Attorney, Agent, or Firm* — Conley Rose, P.C.; Rodney B. Carroll; Monte R. Rhodes

(57) ABSTRACT

A treater regeneration system in a polyolefin production system, the treater regeneration system comprising an off-line treater receiving a first portion of a regenerating stream and regenerating a desiccant in the off-line treater to yield a regenerating effluent stream, where the regenerating stream comprises a regenerating medium, and where the regenerating effluent stream comprises the regenerating medium, water and an impurity; a decanter receiving at least a portion of the regenerating effluent stream to yield the regenerating stream and a water stream, wherein the water stream comprises the water; and a stripper receiving a second portion of the regenerating stream to yield an impurity stream and a process recycle stream, wherein the impurity stream comprises at least a portion of the impurity, and wherein the process recycle stream comprises the regenerating medium of the second portion of the regenerating stream.

23 Claims, 3 Drawing Sheets

(56) References Cited

U.S. PATENT DOCUMENTS

| | | |
|---|---|---|
| 7,056,977 B2 | 6/2006 | Kusudou et al. |
| 7,109,277 B2 | 9/2006 | Hawley et al. |
| 7,119,153 B2 | 10/2006 | Jensen et al. |
| 7,148,298 B2 | 12/2006 | Jensen et al. |
| 7,163,906 B2 | 1/2007 | McDaniel et al. |
| 7,226,886 B2 | 6/2007 | Jayaratne et al. |
| 7,247,594 B2 | 7/2007 | Jayaratne et al. |
| 7,378,537 B2 | 5/2008 | Small et al. |
| 7,501,372 B2 | 3/2009 | Thorn et al. |
| 7,517,939 B2 | 4/2009 | Yang et al. |
| 7,531,606 B2 | 5/2009 | Hendrickson |
| 7,598,327 B2 | 10/2009 | Shaw |
| 7,652,108 B2 | 1/2010 | Mei et al. |
| 8,012,900 B2 | 9/2011 | Murray et al. |
| 8,017,701 B2 | 9/2011 | McElvain et al. |
| 8,119,553 B2 | 2/2012 | Yang et al. |
| 8,138,113 B2 | 3/2012 | Yang et al. |
| 8,207,280 B2 | 6/2012 | Murray et al. |
| 8,288,487 B2 | 10/2012 | Yang et al. |
| 8,383,754 B2 | 2/2013 | Yang et al. |
| 8,431,729 B2 | 4/2013 | Martin et al. |
| 8,501,651 B2 | 8/2013 | Ding et al. |
| 8,703,886 B1 | 4/2014 | Yang et al. |
| 8,846,841 B2 | 9/2014 | Yang et al. |
| 8,912,285 B2 | 12/2014 | Yang et al. |
| 8,932,975 B2 | 1/2015 | Yang et al. |
| 8,987,394 B2 | 3/2015 | Hlavinka et al. |
| 9,289,748 B1 | 3/2016 | Romig et al. |
| 9,687,815 B2 | 6/2017 | Romig et al. |
| 9,861,955 B2 | 1/2018 | Romig et al. |
| 2006/0094590 A1 | 5/2006 | McDaniel et al. |
| 2010/0029872 A1 | 2/2010 | Jensen et al. |
| 2010/0041842 A1 | 2/2010 | Yang et al. |
| 2011/0142738 A1 | 6/2011 | Pandya et al. |
| 2011/0289951 A1 | 12/2011 | Furlong et al. |
| 2012/0004489 A1 | 1/2012 | Mills et al. |
| 2013/0306906 A1 | 11/2013 | Das et al. |
| 2014/0004017 A1 | 1/2014 | Lok et al. |
| 2014/0256889 A1* | 9/2014 | McElvain .............. B01J 8/0015 526/64 |

FOREIGN PATENT DOCUMENTS

| | | |
|---|---|---|
| WO | 0224614 A1 | 3/2002 |
| WO | 2006026493 A1 | 3/2006 |
| WO | 2016201070 A1 | 12/2016 |

OTHER PUBLICATIONS

Foreign communication from a counterpart application—International Search Report and Written Opinion, PCT/US2017/062330, dated Apr. 10, 2018, 18 pages.

Foreign communication from a counterpart application—Invitation to Pay Additional Fees and Partial Search Report, PCT/US2017/062330, dated Feb. 16, 2018, 13 pages.

* cited by examiner

TREATER REGENERATION

CROSS-REFERENCE TO RELATED APPLICATIONS

This application is a continuation of and claims priority to U.S. patent application Ser. No. 15/585,987 filed May 3, 2017, published as U.S. Patent Application Publication No. US 2017/0232422 A1, which is a continuation-in-part of and claims priority to U.S. patent application Ser. No. 15/044,222 filed Feb. 16, 2016, now U.S. Pat. No. 9,687,815, which is a continuation of and claims priority to U.S. patent application Ser. No. 14/737,335 filed Jun. 11, 2015, now U.S. Pat. No. 9,289,748, entitled "Treater Regeneration," each of which is hereby incorporated by reference in its entirety for all purposes.

STATEMENT REGARDING FEDERALLY SPONSORED RESEARCH OR DEVELOPMENT

Not applicable.

REFERENCE TO A MICROFICHE APPENDIX

Not applicable.

FIELD

This disclosure relates to the regeneration of feed stream treaters in olefin polymerization processes and systems.

BACKGROUND

Polyolefins can be prepared by polymerization of olefins in one or more reactors where feed materials such as diluent, monomer, comonomer and catalyst are introduced. The catalyst used can be sensitive to process impurities, or "poisons." Thus, polyolefin production processes generally include treating reactor feeds to remove impurities prior to introduction of the feeds into the polymerization reactor(s). Techniques for treating reactor feeds include using a desiccant which traps the impurities. Over time, the desiccant can become saturated with impurities, creating a need for regeneration of the desiccant in order to maintain effective removal of the impurities. However, current regeneration processes can be costly, both in terms of nitrogen and fuel gas consumption, and in terms of the costs associated with regeneration times being longer than a month in some cases.

SUMMARY

Embodiments of the disclosure include a method of regenerating a desiccant in an off-line treater of a polyolefin production process. The method may include a heating phase followed by a cooling phase.

In embodiments, the heating phase may include treating a recycle stream of the polyolefin production process in an on-line treater having desiccant to yield a treated recycle stream, heating at least a portion of the treated recycle stream to yield a regenerating gas, regenerating at least a portion of the desiccant in the off-line treater using the regenerating gas to yield a regenerating effluent stream, separating the regenerating effluent stream into an impurity stream and a regenerating recycle stream, and recycling the regenerating recycle stream to the on-line treater.

In embodiments, the cooling phase may include thermosyphoning a regenerating gas, nitrogen, an olefin-free diluent, or combinations thereof in a closed-convection loop of the off-line treater to cool the off-line treater to a temperature in the range of from 150° F. (66° C.) to 400° F. (204° C.).

Disclosed herein is a method of regenerating a desiccant in an off-line treater of a polyolefin production process, the method comprising a heating phase followed by a cooling phase, the heating phase comprising heating a regenerating stream comprising a regenerating medium, regenerating at least a portion of the desiccant in the off-line treater using the regenerating medium to yield a regenerating effluent stream comprising the regenerating medium, water, and an impurity, and decanting the regenerating effluent stream into a water stream comprising the water and the regenerating stream.

Further disclosed herein is a method of regenerating a desiccant in an off-line treater of a polyolefin production process, the method comprising a heating phase followed by a cooling phase, the cooling phase comprising cooling a regenerating effluent stream obtained from the off-line treater, wherein the regenerating effluent stream comprises a regenerating medium, recycling a regenerating stream comprising the regenerating medium from a decanter to the off-line treater, and cooling the off-line treater to a temperature of about 150° F. (66° C.) with the regenerating medium.

Also disclosed herein is a method of regenerating a desiccant in an off-line treater of a polyolefin production process, the method comprising a heating phase followed by a cooling phase, the heating phase comprising heating a regenerating stream comprising a regenerating medium, regenerating at least a portion of the desiccant in the off-line treater using the regenerating medium to yield a regenerating effluent stream comprising the regenerating medium and water, and decanting in a decanter the regenerating effluent stream into a water stream comprising the water and the regenerating stream comprising the regenerating medium, the cooling phase comprising cooling the regenerating effluent stream obtained from the off-line treater, recycling the regenerating stream from the decanter to the off-line treater, and cooling the off-line treater with the regenerating medium obtained from the decanter.

DETAILED DESCRIPTION OF THE EMBODIMENTS

Figure 1:
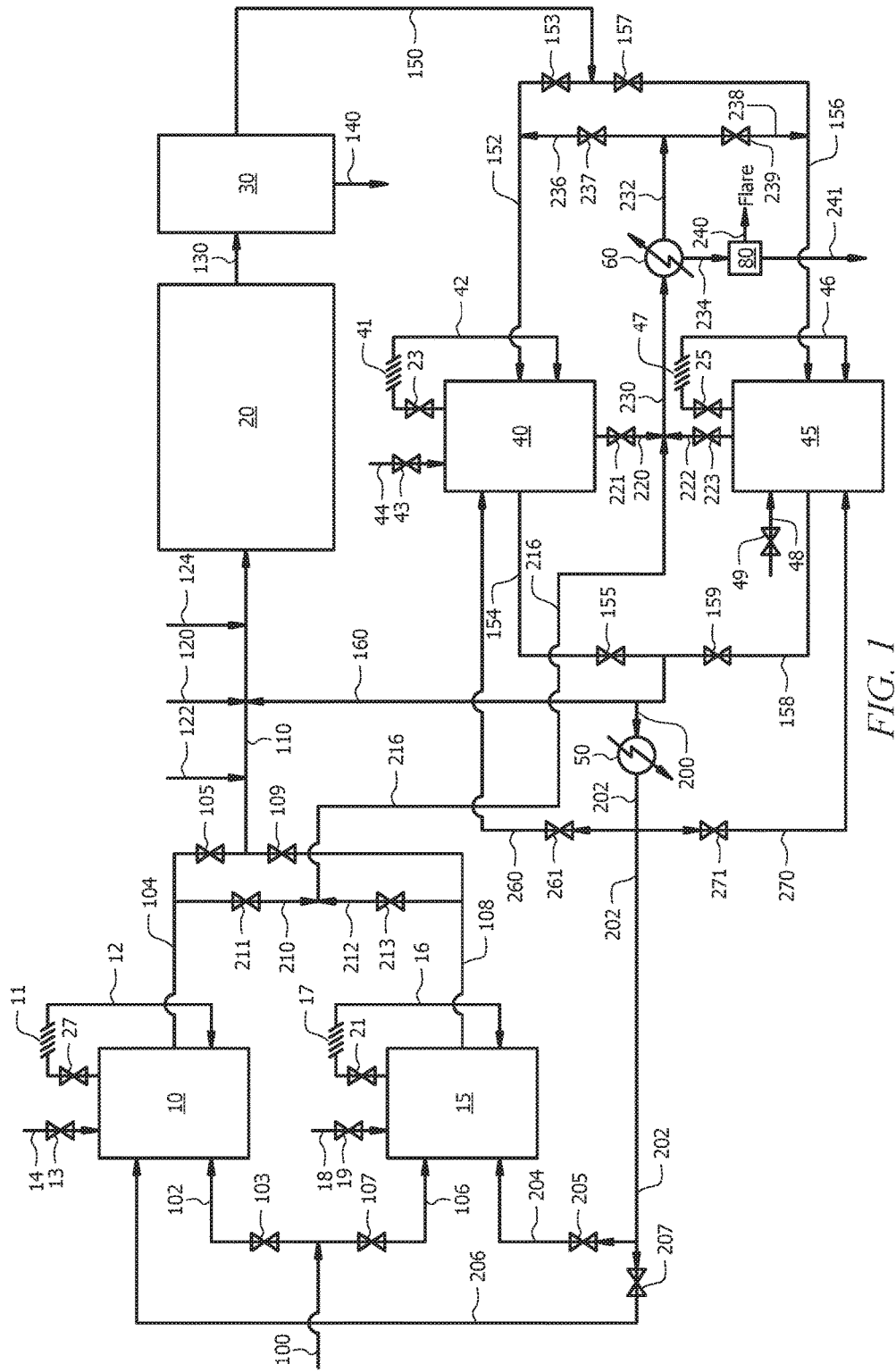
FIG. 1 illustrates a process flow diagram of an embodiment of a polyolefin production process which utilizes treaters for feed and recycle streams according to the disclosure.

Disclosed herein are embodiments which provide for improved regeneration of treaters for feed streams and recycle streams in a polyolefin production process. The treaters according to embodiments of the disclosure include a pair of feed treaters having desiccant (e.g., in one or more desiccant beds) therein for removing water and, in some embodiments, other impurities from a feed stream of the polyolefin production process. In operation, at least one of the pair of feed treaters is on-line (e.g., operates in a continuous mode so as to accept a feed stream and treat the same to yield a treated feed stream) to treat the feed stream of the polyolefin production process which is passed through the feed treater(s) so as to remove one or more impurities. The treated feed stream which flows from the feed treatment system (optionally combined with a treated recycle stream comprising a diluent, with fresh comonomer, or both) passes to a polymerization reactor where polyolefins (also referred to herein interchangeably with the term polymer composition) are formed by contacting the olefin monomer from the treated feed stream with a catalyst system under conditions suitable for the formation of a polymer composition. An effluent is recovered from the polymerization reactor and separated to recover the polymer composition in a product stream and the diluent and any unreacted monomer and/or unreacted comonomer in a recycle stream. The recycle stream is treated in other treaters which include one or a pair of recycle treaters having desiccant (e.g., one or more desiccant beds) therein for removing water and, in some embodiments, other impurities from the recycle stream. In operation, at least one of the pair of recycle treaters is on-line (e.g., operates in a continuous mode so as to accept the recycle stream and treat same to yield a treated recycle stream) to treat the recycle stream of the polyolefin production process which is passed through the recycle treater(s) so as to remove one or more impurities. The treated recycle stream is recycled to the polymerization reactor.

During the course of operation, the treaters of the polyolefin production process may become saturated with impurities, causing impurities to flow through the treaters and into the polymerization reactor. An increase in the melt index of the polymer composition and/or a decrease in polymerization efficiency may indicate saturation of the desiccant in a treater. The feed treaters and recycle treaters are operated in parallel pairs such that one of the pair of feed treaters and/or one of the pair of recycle treaters may be taken off-line line (e.g., isolated from flow of the feed stream or recycle stream by actuating valves as described hereinbelow) so that the desiccant therein may be regenerated while the other of the pair of feed treaters and/or the other of the pair of the recycle treaters is on-line.

Embodiments of regeneration disclosed herein may additionally or alternatively also utilize thermosyphoning, in a cooling phase of regeneration, of nitrogen, of the diluent from the treated recycle stream, of an olefin-free diluent, or combinations thereof, as is described in more detail herein.

The disclosed embodiments include the use of at least a portion of the treated recycle stream to regenerate an off-line treater (e.g., one of a pair of feed treaters which is taken off-line for regeneration, one of a pair of recycle treaters which is taken off-line for regeneration, or both). Using at least a portion of the treated recycle stream to regenerate an off-line treater utilizes available recycle diluent in the polyolefin production process and reduces or negates the need for nitrogen or other regenerating mediums which involve capital expenditure, create additional waste, and/or need subsequent separations and/or storage. Additionally, incorporation of thermosyphoning techniques disclosed herein reduces the cooling time required for the off-line treater being regenerated.

Referring to FIG. 1, there is shown a process flow diagram of an embodiment of a polyolefin production process which has a pair of feed treaters 10 and 15 for a feed stream 100, a polymerization zone 20, a product recovery system 30, and a pair of recycle treaters 40 and 45 for a recycle stream 150.

The feed stream 100 may include one or more olefin monomers as well as one or more impurities. The one or more olefin monomers may include linear or branched olefins having from 2 to 30 carbon atoms. Examples of olefin monomers include ethylene, propylene, 1-butene, 1-hexene, 1-octene, 3-methyl-1-butene, 4-methyl-1-pentene, and combinations thereof. The one or more impurities may include water, oxygen, carbon dioxide, sulfur compounds, alcohols, acetylene, or combinations thereof. Additionally, the feed stream 100 may include one or more other components such as a catalyst, co-catalysts, fresh diluent, additives, or combinations thereof. As discussed herein, the one or more other components may alternatively be added to the polyolefin production process in other locations.

Feed treaters 10 and 15 are operated in parallel such that at least one of the feed treaters 10 and 15 is on-line to treat (e.g., remove one or more impurities from) the feed stream 100, while the other of the feed treaters 10 and 15 is off-line being regenerated, standing by to go on-line, or also on-line but not saturated with impurities. While FIG. 1 shows a single pair of feed treaters 10 and 15, it is contemplated that polyolefin production processes may include multiple pairs of feed treaters, for example from 2 to 20 pairs of feed treaters, or from 2 to 10 pairs of feed treaters, or from 2 to 5 feed treaters.

Each of the feed treaters 10 and 15 may be a vessel having desiccant therein arranged in one or more desiccant beds. For example, and without limitation, each treater 10 and 15 may have from 1 to 30, from 1 to 20, or from 1 to 15 desiccant beds. The desiccant is discussed in more detail herein.

In an embodiment where feed treater 10 is on-line and feed treater 15 is off-line, valve 103 in stream 102 and valve 105 in stream 104 are in the open position, and valve 107 in stream 106 and valve 109 in stream 108 are in the closed position. Untreated olefin monomer of the feed stream 100 flows through valve 103 and stream 102 such that the untreated olefin monomer is introduced into treater 10. In an embodiment, the untreated olefin monomer is introduced into the treater 10 at the bottom of said treater 10. The olefin monomer flows through the desiccant beds in the treater 10, for example, from the bottom to the top of the treater 10, and one or more impurities are removed from the olefin monomer by the desiccant contained in the treater 10. The treated monomer flows from the treater 10 via stream 104, valve 105, stream 110, and into polymerization zone 20. The flow of the olefin monomer in treater 10 may alternatively be from top to bottom.

In an embodiment where feed treater 15 is on-line and feed treater 10 is off-line, valve 107 in stream 106 and valve 109 in stream 108 are in the open position, and valve 103 in stream 102 and valve 105 in stream 104 are in the closed position. Untreated olefin monomer of the feed stream 100 flows through valve 107 and stream 106 such that the untreated olefin monomer is introduced into treater 15. In an embodiment, the untreated olefin monomer is introduced into the treater 15 at the bottom of said treater 15. The olefin monomer flows through the desiccant beds in the treater 15, for example, from the bottom to the top of the treater 15, and one or more impurities are removed from the olefin monomer by the desiccant contained in the treater 15. The treated monomer flows from the treater 15 via stream 108, valve 109, stream 110, and into polymerization zone 20. The flow of the olefin monomer in treater 15 may alternatively be from top to bottom.

Treatment conditions include a residence time sufficient to remove at least a portion of the impurities from the feed stream 100. Treatment conditions may include a temperature in the range of about 35° F. (about 1.6° C.) to about 80° F. (about 27° C.); alternatively, about 40° F. (about 4.4° C.) to about 70° F. (about 21° C.); alternatively, about 45° F. (about 7.2° C.) to about 60° F. (about 15° C.). Treatment conditions may include a pressure in the range of about 600 psig (about 4.14 MPag) to about 850 psig (about 5.86 MPag); alternatively, about 700 psig (about 4.83 MPag) to about 825 psig (about 5.69 MPag); alternatively, about 750 psig (about 5.17 MPag) to about 800 psig (about 5.52 MPag).

The treated feed flowing in stream 104 and/or 108 generally includes a level of impurities that is less than a level of impurities present in the feed stream 100. The amount of an impurity or multiple impurities may be measured and monitored in stream 104, stream 108, and feed stream 100 using techniques known in the art with the aid of this disclosure, for example, high performance liquid chromatography (HPLC), gas chromatography (GC), or Raman spectroscopy. The impurities may be measured in an online apparatus in streams 100, 104 and/or 108, or a sample may be taken from any of stream 104, stream 108, and feed stream 100 and subsequently analyzed for impurity concentration. In embodiments, the treated feed flowing in stream 104 and/or 108 may include less than 200 ppm, less than 150 ppm, less than 100 ppm, less than 75 ppm, or less than 50 ppm of one or more impurities.

With continued reference to FIG. 1, fresh comonomer (e.g., hexene, butene, or combinations thereof) is illustrated as flowing in stream 120, fresh diluent flowing in stream 122, catalyst flowing in stream 124, and treated recycle diluent flowing in stream 160 may be combined with the treated feed in stream 110 prior to introduction to the polymerization zone 20. It is contemplated that any combination of comonomer, catalyst, fresh diluent, and treated recycle diluent may be added to the treated feed for introduction into the polymerization zone 20 via stream 110; or, any of comonomer, catalyst, fresh diluent, and treated recycle diluent may be introduced to the polymerization zone 20 in other locations of the polyolefin production process, e.g., any of the above-cited components may be combined with the components in feed stream 100, or any of the above-cited components may be introduced into the polymerization zone 20 separately of the feed stream 100 or treated feed stream 110. Moreover, while FIG. 1 shows fresh diluent is combined with the treated feed in stream 110 before comonomer and treated recycle diluent, which are combined before the catalyst, the order of combining components which are introduced to the polymerization zone 20 via stream 110 may vary according to techniques known to those skilled in the art with the aid of this disclosure.

The catalyst that can be employed in accordance with the methods and systems of the present disclosure may comprise any catalyst system compatible with and able to produce polyolefins. For example, the catalyst may be a chromium based catalyst system, a single site transition metal catalyst system including both single and multiple (two or more) metallocene catalyst systems, a Ziegler-Natta catalyst system, or combinations thereof. In embodiments, the catalyst may be activated for subsequent polymerization and may or may not be associated with a support material.

Examples of catalyst systems which can be used are described in U.S. Pat. Nos. 6,355,594; 6,376,415; 6,395,666; 6,511,936; 6,524,987; 6,528,448; 6,531,565; 6,534,609; 6,828,268; 6,852,660; 6,911,505; 6,911,506; 6,936,667; 6,977,235; 7,056,977; 7,109,277; 7,119,153; 7,148,298; 7,163,906; 7,226,886; 7,247,594; 7,378,537; 7,501,372; 7,517,939; 8,012,900; 8,119,553; 8,138,113; 8,207,280; 8,288,487; 8,383,754; 8,431,729; 8,501,651; 8,703,886; 8,846,841; 8,912,285; 8,932,975; and 8,987,394, each of which is incorporated by reference herein in its entirety.

The diluent may include hydrocarbons which are alkanes. Examples of suitable diluents for use in accordance with the present disclosure include but are not limited to propane, n-butane, isobutane, n-pentane, isopentane, neopentane, cyclohexane, n-hexane, and heptane. In one or more specific embodiments, the diluent is selected from propane, isobutane, hexane, heptane, or combinations thereof.

Hydrogen and other additives may also be introduced into the polymerization zone 20 (e.g. combined in stream 110, introduced separately, or combined with another component and introduced together with the other component). Hydrogen may be used to control the molecular weight of the polyolefin formed in the polymerization zone 20. Additives may include antistatic materials, chain transfer agents, or other additives known in the art of polyolefin production processes.

The polymerization zone 20 may include one or more polymerization reactors capable of polymerizing olefin monomers to produce polyolefins such as homopolymers or copolymers. In one or more embodiments, the polymerization of olefins may include the homopolymerization of ethylene or propylene; the copolymerization of ethylene and a higher 1-olefin (e.g., 1-butene, 1-pentene, 1-hexene, 1-octene or 1-decene); the copolymerization of propylene and a higher 1-olefin (e.g., 1-butene, 1-pentene, 1-hexene, 1-octene or 1-decene), or combinations thereof (for polyolefin production processes having multiple reactors). Additionally, the polyolefins produced may be unimodal, bimodal, or multimodal. A produced polyolefin may have a first component and a second component. The first component can be a linear low density polyethylene (LLDPE), and the second component can be a high density polyethylene (HDPE). The HDPE can be a high molecular weight (HMW) polyolefin or a low molecular weight (LMW) polyolefin. The LLDPE can be a high molecular weight (HMW) polyolefin or a low molecular weight (LMW) polyolefin. In an embodiment, the HDPE can be a HMW polyolefin, and the LLDPE can be a LMW polyolefin. The first component, the second component, or both the first component and the second component of the polyolefin can have short chain branching.

The various types of reactors suitable for use in the polymerization zone 20 include those known in the art which may be referred to as batch, slurry, gas-phase, solution, high pressure, tubular, or autoclave reactors. Batch-type reactors can include continuous flow stirred-tank (CSTR) reactors. Gas phase reactors may include fluidized bed reactors or staged horizontal reactors. Slurry reactors may include vertical or horizontal loop reactors. High pressure reactors may include autoclave and/or tubular reactors, singly or in combination, and optionally in series. The reactor types can include batch or continuous processes. Batch processes have no product discharge. Continuous processes can utilize intermittent or continuous product discharge. Processes may also include partial or full direct recycle of un-reacted monomer, un-reacted comonomer, and/or diluent.

In embodiments where polymerization zone 20 has multiple reactors, the one or more reactors may include the same or different type of reactors. The operating conditions in one of the reactors may be different than the operating conditions in the other reactor(s). Multiple reactor systems may include any combination of reactors including, but not limited to, multiple loop reactors, multiple gas reactors, a combination of loop and gas reactors, multiple high pressure reactors, or a combination of high pressure with loop and/or gas reactors. The multiple reactors may be operated in series or in parallel.

Polyolefin production in multiple reactors may include two separate polymerization reactors interconnected by a transfer system thereby making it possible to transfer the polyolefin resulting from the first polymerization reactor into the second polymerization reactor. Alternatively, polymerization in multiple reactors may include the manual transfer of polyolefin from one reactor to subsequent reactors for continued polymerization.

In embodiments where polymerization zone 20 has at least two reactors, the first reactor can produce a first component of a polyolefin product, and the second reactor can produce a second component of a polyolefin product. The first component and the second component can have the characteristics described above. That is, the first component produced in the first reactor can be a linear low density polyethylene (LLDPE), and the second component produced in the second reactor can be a high density polyethylene (HDPE). The LLDPE can be a high molecular weight (HMW) polyolefin or a low molecular weight (LMW) polyolefin. The HDPE can be a high molecular weight (HMW) polyolefin or a low molecular weight (LMW) polyolefin. In an embodiment, the LLDPE produced in the first reactor can be a LMW polyolefin, and the HDPE produced in the second reactor can be a HMW polyolefin, and in some embodiments, the first component, the second component, or both the first component and the second component can have short chain branching.

The polymerization conditions within the polymerization zone 20 include temperature, pressure, flow rate, mechanical agitation, product takeoff, residence time, and concentrations. Any combination of these conditions may be selected to achieve the desired polyolefin properties. Conditions that are controlled for polymerization efficiency and to provide desired product properties may include temperature, pressure, and the concentrations of various reactants. Polymerization temperature can affect catalyst activity, molecular weight of the polyolefin, and molecular weight distribution of the polyolefin.

Polymerization temperatures may include any temperature below the de-polymerization temperature according to the Gibbs Free energy equation. For example, the polymerization temperature may be in the range of about 140° F. (about 60° C.) to about 536° F. (about 280° C.), or about 158° F. (about 70° C.) to about 230° F. (about 110° C.), depending upon the type of polymerization reactor.

Polymerization pressures also vary according to the reactor and polymerization type. The pressure for liquid phase polymerizations in a slurry loop reactor may be less than about 1000 psig (about 6.90 MPag) while the pressure for gas phase polymerization may vary from about 200 psig (about 1.38 MPag) to about 500 psig (about 3.45 MPag). High pressure polymerization in tubular or autoclave reactors may run at pressures of from about 20,000 psig (about 138 MPag) to about 75,000 psig (about 517 MPag). Polymerization reactors can also be operated in a supercritical region occurring at generally higher temperatures and pressures.

The concentration of the various components (e.g., treated feed, treated recycle diluent, catalyst components, comonomer, hydrogen, additives, or combinations thereof) in the polymerization zone 20 can be controlled to produce polyolefins having certain physical and mechanical properties. The proposed end-use product that will be formed by the polyolefin(s) and the method of forming that product can determine the desired properties. Mechanical properties of the formed end-use product may include tensile, flexural, impact, creep, stress relaxation, and hardness tests. Physical properties of the polyolefin polymer produced may include density, molecular weight, molecular weight distribution, melting temperature, glass transition temperature, temperature melt of crystallization, density, stereoregularity, crack growth, long chain branching and rheological measurements, for example.

Examples of polymerization processes suitable for use in the polymerization zone 20 are described in U.S. Pat. Nos. 3,061,601; 3,248,179; 4,212,847; 4,501,885; 5,028,670; 5,534,607; 5,565,175; 5,575,979; 6,096,840; 6,239,235; 6,833,415; 7,531,606; 7,598,327; and 7,652,108, each of which is incorporated by reference herein in its entirety.

With continued reference to FIG. 1, reaction effluent flows from the polymerization zone 20 in stream 130 and into a product recovery system 30. The product recovery system 30 may include a continuous take-off valve, a flashline heater for vaporizing liquid components from the polyolefin (e.g., diluent, unreacted monomer, and unreacted comonomer), a flash vessel for separating the polyolefin product from unreacted monomer, unreacted comonomer, diluent, residual catalyst, or combinations thereof. The polyolefin product may flow from the product recovery system 30 via stream 140, for example, to an extrusion/load-out system. Typically, the polyolefin product is in the form of polymer fluff which is further processed into pellets using an extrusion/load-out system for shipment to customers. The unreacted monomer, unreacted comonomer, diluent, residual catalyst, or combinations thereof may flow from the product recovery system via stream 150.

The product recovery system 30 may include (in addition to or in the alternative to the flash vessel) one or more fractionation vessels to recover the diluent for recycle to the polymerization zone. For example, the one or more fractionation vessels may (not shown for purposes of clarity) remove undesirable heavy components (e.g., $C_6$ hydrocarbons and heavier) and light components (e.g., hydrogen, oxygen, nitrogen, byproducts resulting from the presence of hydrogen/oxygen/nitrogen) from the diluent and unreacted monomer/comonomer. The one or more fractionation vessels may also separate unreacted monomer and/or comonomer from the diluent to yield an olefin-free diluent stream for use in the regeneration of the treaters as described hereinbelow. Examples of product recovery systems 30 are described in U.S. Pat. Nos. 4,501,885; 5,534,607; 5,575,979; 6,096,840; 6,239,235; 6,833,415; 7,531,606; and 7,652,108, each of which is incorporated by reference herein in its entirety. Diluent which is to be recycled to the polymerization zone 20 may also flow in stream 150 from the product recovery system 30 to recycle treater 40 and/or 45.

This disclosure contemplates that other configurations may be utilized to ultimately recover polyolefin product and recycle diluent than the configuration shown in FIG. 1. The present disclosure may be applicable for any polyolefin production process in which a diluent may be recovered from a polymerization zone and subsequently treated for use in regenerating treaters (e.g., feed treaters and recycle treaters) in the polyolefin production process.

Recycle treaters 40 and 45 are operated in parallel such that at least one of the recycle treaters 40 and 45 is on-line to treat (e.g., remove one or more impurities from) the recycle diluent in recycle stream 150, while the other of the recycle treaters 40 and 45 is off-line being regenerated, standing by to go on-line, or also on-line but not saturated with impurities. While FIG. 1 shows a single pair of recycle treaters 40 and 45, it is contemplated that polyolefin production processes may include multiple pairs of recycle treaters, for example from 2 to 20 pairs of recycle treaters, or from 2 to 10 pairs of recycle treaters, or from 2 to 5 recycle treaters.

Each of the recycle treaters 40 and 45 may be a vessel having desiccant therein arranged in one or more desiccant beds. For example, each treater 40 and 45 may have from 1 to 30, from 1 to 20, or from 1 to 15 desiccant beds. The desiccant is discussed in more detail herein.

In an embodiment where recycle treater 40 is on-line and recycle treater 45 is off-line, valve 153 in stream 152 and valve 155 in stream 154 are in the open position, and valve 157 in stream 156 and valve 159 in stream 158 are in the closed position. Untreated recycle components (e.g., untreated diluent, unreacted monomer, unreacted comonomer, or combinations thereof) of the recycle stream 150 flow through valve 153 and stream 152 such that the untreated recycle components are introduced into treater 40. In an embodiment, the untreated recycle components are introduced into the treater 40 at the bottom of said treater 40. The recycle components flow through the desiccant beds in the treater 40, for example, from the bottom to the top of the treater 40, and one or more impurities are removed from the recycle components by the desiccant contained in the treater 40. Treated recycle components (e.g., treated diluent, unreacted monomer, unreacted comonomer, or combinations thereof) may flow from the treater 40 via stream 154, valve 155, stream 160, stream 110, and into polymerization zone 20. The flow of the recycle components in treater 40 may alternatively be from top to bottom.

In an embodiment where recycle treater 45 is on-line and recycle treater 40 is off-line, valve 157 in stream 156 and valve 159 in stream 158 are in the open position, and valve 153 in stream 152 and valve 155 in stream 154 are in the closed position. Untreated recycle components (e.g., untreated diluent, unreacted monomer, unreacted comonomer, or combinations thereof) of the recycle stream 150 flow through valve 157 and stream 156 such that the untreated recycle components are introduced into treater 45. In an embodiment, the untreated recycle components are introduced into the treater 45 at the bottom of said treater 45. The recycle components flow through the desiccant beds in the treater 45, for example, from the bottom to the top of the treater 45, and one or more impurities are removed from the recycle components by the desiccant contained in the treater 45. The treated recycle components (e.g., treated diluent, unreacted monomer, unreacted comonomer, or combinations thereof) may flow from the treater 45 via stream 158, valve 159, stream 160, stream 110, and into polymerization zone 20. The flow of the recycle components in the treater 45 may alternatively be from top to bottom.

Recycle treatment conditions include a residence time sufficient to remove at least a portion of the impurities from the recycle stream 150. Treatment conditions may include a temperature in the range of about 35° F. (about 1.6° C.) to about 80° F. (about 27° C.); alternatively, about 40° F. (about 4.4° C.) to about 70° F. (about 21° C.); alternatively, about 45° F. (about 7.2° C.) to about 60° F. (about 15° C.). Treatment conditions may include a pressure in the range of about 600 psig (about 4.14 MPag) to about 850 psig (about 5.86 MPag); alternatively, about 700 psig (about 4.83 MPag) to about 825 psig (about 5.69 MPag); alternatively, about 750 psig (about 5.17 MPag) to about 800 psig (about 5.52 MPag).

The treated recycle components flowing in stream 154 and/or 158 generally includes a level of impurities that is less than a level of impurities present in the recycle stream 150. The amount of an impurity or multiple impurities may be measured and monitored in stream 154, stream 158, and recycle stream 150 using techniques known in the art with the aid of this disclosure, for example, high performance liquid chromatography (HPLC), gas chromatography (GC), or Raman spectroscopy. The impurities may be measured in an online apparatus in streams 150, 154, and/or 158, or a sample may be taken from any of stream 154, stream 158, and recycle stream 150 and subsequently analyzed for impurity concentration. In embodiments, the treated recycle components may include less than 200 ppm, less than 150 ppm, less than 100 ppm, less than 75 ppm, or less than 50 ppm of impurities.

The disclosure contemplates that the polyolefin production process shown in FIG. 1 may include equipment such as storage tanks (e.g., for storing monomer, comonomer, diluent, and catalyst), accumulators, valves, pipes, pumps, heat exchangers, agitators, injection apparatus, flow meters, measurement equipment, control system, or combinations thereof which are not illustrated in FIG. 1 for purposes of clarity.

The desiccant in the one or more desiccant beds in treaters 10, 15, 40, and 45 may be molecular sieve, activated alumina, silica gel, montmorillonite clay, calcium oxide, calcium sulfate, calcium chloride, activated carbon, metal salts, phosphorus-containing desiccant compounds, or combinations thereof. The term "molecular sieve" refers to a material having a fixed, open-network structure, usually crystalline, that may be used to separate hydrocarbons from the impurities disclosed herein by selective occlusion of one or more of the impurities. An example of a molecular sieve is a zeolite, which has a silicate lattice, often in association with aluminum, boron, gallium, iron, and/or titanium. An example of a zeolite is a 13× molecular sieve. In accordance with one or more embodiments, the molecular sieves have a pore size of 10 angstroms (Å) or more. An example of activated alumina is sodium treated alumina.

The desiccant beds absorb one or more of the disclosed impurities such that such impurities do not pass out of the treaters 10, 15, 40, and 45 and into subsequent polymerization reactors (except in cases where a treater is saturated and impurities pass through the treaters). Once the desiccant in any of treaters 10, 15, 40, and 45 becomes saturated with one or more impurities, regeneration is required.

Regeneration of the desiccant in treaters 10, 15, 40, and 45 generally involves i) taking the treater 10, 15, 40, or 45 off-line, and ii) regenerating the desiccant. Generally, only one of the pair of feed treaters 10 and 15 and one of the pair of recycle treaters 40 and 45 is taken off-line at a time. It is contemplated that one of the pair of feed treaters 10 and 15 and one of the pair of recycle treaters 40 and 45 may be off-line at the same point in time.

Taking a treater 10, 15, 40, or 45 off-line generally involves closing valves so as to fluidly isolate the treater which is to be taken off-line. To take treater 10 off-line, valves 103 and 105 are actuated to the closed position. To take treater 15 off-line, valves 107 and 109 are actuated to the closed position. To take treater 40 off-line, valves 153, 155, and 237 are actuated to the closed position. To take treater 45 off-line, valves 157, 159, and 239 are actuated to the closed position. It is contemplated that polyolefin production processes may have valves and/or piping in different configurations than that shown in FIG. 1, and the particular procedure for rendering a treater off-line may be different than those described herein while still involving fluidly isolating the treater from the rest of the polyolefin production process.

Preparing the off-line treater for regeneration generally involves depressurizing the off-line treater, and fluidly connecting the off-line treater to receive the treated recycle stream and to emit impurities in a flow path that is recycled to the recycle treater 40 and/or 45.

Depressurizing the off-line treater generally involves releasing contents of the off-line treater until the pressure of the treater reaches a suitable pressure, e.g., about 150 psig (1.03 MPag) or less. The contents of the off-line treater can be released through a purge stream or one of the streams shown in FIG. 1 for treaters 10, 15, 40, and 45.

To fluidly connect the feed treater 10 which is off-line for regeneration, valves 207 and 211 are actuated to the open position such that the off-line feed treater 10 is fluidly connected to the treated recycle stream 160 (via streams 200, 202, and 206) and to a flow path which is the regenerating effluent stream (which, in FIG. 1, is the flow path defined by streams 104, 210, 216, and 230). To fluidly connect the feed treater 15 which is off-line for regeneration, valves 205 and 213 are actuated to the open position such that the off-line feed treater 15 is fluidly connected to the treated recycle stream 160 (via streams 200, 202, and 204) and to a flow path which is the regenerating effluent stream (which, in FIG. 1, is the flow path defined by streams 108, 212, 216, and 230). To fluidly connect the recycle treater 40 which is off-line for regeneration, valves 261 and 221 are actuated to the open position such that the off-line recycle treater 40 is fluidly connected to the treated recycle stream 160 (via streams 200, 202, and 260) and to a flow path which is the regenerating effluent stream (which, in FIG. 1, is the flow path defined by streams 220 and 230). To fluidly connect the recycle treater 45 which is off-line for regeneration, valves 271 and 223 are actuated to the open position such that the off-line recycle treater 45 is fluidly connected to the treated recycle stream 160 (via streams 200, 202, and 270) and to a flow path which is the regenerating effluent stream (which, in FIG. 1, is the flow path defined by streams 222 and 230).

After the treater 10, 15, 40, or 45 is taken off-line, depressurized, and fluidly connected (to the treated recycle stream 160 and to the respective flow path which is the regenerating effluent stream, as described for each treater 10, 15, 40, and 45 above), the process of regenerating the desiccant therein may commence. The process of regenerating the desiccant may be divided into phases: a heating phase, a cooling phase, a holding phase, or combinations thereof.

The heating phase includes treating the recycle stream 150 of the polyolefin production process in an on-line treater (e.g., one or both of recycle treaters 40 and 45 which are on-line) to yield the treated recycle stream 160, heating at least a portion of the treated recycle stream 160 to yield a regenerating gas, regenerating at least a portion of the desiccant in the off-line treater (feed treater 10 or 15 which is off-line, and/or recycle treater 40 or 45 which is off-line) using the regenerating gas to yield a regenerating effluent stream (described in more detail below), separating the regenerating effluent stream into an impurity stream 234 and a regenerating recycle stream 232; and recycling the regenerating recycle stream 232 to the on-line treater (one or both of recycle treaters 40 and 45).

The step of treating the recycle stream 150 is performed as described above for recycle treaters 40 or 45. When recycle treater 40 is on-line, treated recycle components flow in stream 154 through valve 155 and into treated recycle stream 160. When recycle treater 45 is on-line, treated recycle components flow in stream 158 through valve 159 and into treated recycle stream 160.

In the step of heating, a portion (e.g., 1 wt % to 99 wt %, 10 wt % to 90 wt %, or 20 wt % to 80 wt %) of the treated recycle stream 160 flows into heater 50 via stream 200 where the treated recycle components are heated to a temperature in the range of 400° F. (204° C.) to 600° F. (316° C.) so as to vaporize said components to yield a regenerating gas. The regenerating gas may be the treated recycle components (e.g., diluent, unreacted monomer, unreacted comonomer, or combinations thereof) in gaseous phase. In embodiments, the regenerating gas may additionally include nitrogen; alternatively, the regenerating gas may not include (exclude) nitrogen. The regenerating gas may flow from the heater 50 in stream 202. The heater 50 may be any heating system known in the art such as a heat exchanger, an electric heater, or a combination thereof connected in series. Examples of a heating system of heater 50 are found in U.S. Pat. Nos. 2,625,915 and 3,585,971, each of which is incorporated herein by reference in its entirety.

The step of regenerating may include introducing the regenerating gas into the off-line treater being regenerated, and removing an impurity (e.g., of the one or more impurities discussed herein) from the desiccant in the off-line treater with the regenerating gas. In the step of regenerating, the regenerating gas may flow via stream 202 to one of the pair of feed treaters 10 and 15 which is off-line for regeneration, to one of the pair of recycle treaters 40 and 45 which is off-line for regeneration, or both. When feed treater 10 is off-line for regeneration, the regenerating gas flows via stream 202, valve 207, and stream 206 for introduction to the feed treater 10. When feed treater 15 is off-line for regeneration, the regenerating gas flows via stream 202, valve 205, and stream 204 for introduction to the feed treater 15. When recycle treater 40 is off-line for regeneration, the regenerating gas flows via stream 202, valve 261, and stream 260 for introduction to the recycle treater 40. When recycle treater 45 is off-line for regeneration, the regenerating gas flows via stream 202, valve 271, and stream 270 for introduction to the recycle treater 45. In embodiments, the regenerating gas passes through the desiccant in the off-line treater being regenerated from bottom to top. Alternatively, the regeneration gas may flow through the off-line treater from top to bottom.

The regenerating gas passes through the desiccant (e.g., in one or more desiccant beds) of the off-line treater being regenerated during the heating phase as the temperature increases to the temperature of regeneration, e.g. a temperature in the range of about 400° F. (204° C.) to 600° F. (about 316° C.), or about 450° F. (about 232° C.) to about 600° F. (about 316° C.). The pressure of the off-line treater may increase as the temperature increases, and the regeneration pressure includes a pressure in the range of about 600 psig (about 4.14 MPag) to about 850 psig (about 5.86 MPag), about 700 psig (about 4.83 MPag) to about 825 psig (about 5.69 MPag), or about 750 psig (about 5.17 MPag) to about 800 psig (about 5.52 MPag). Alternatively, the pressure of the off-line treater may be maintained at a regeneration pressure during the heating phase, e.g., for feed treater 10, using stream 14 (e.g., a pressure supply stream) having appropriate valve 13 for maintaining the pressure of the feed treater 10. Likewise, stream 18 (e.g., a pressure supply stream) having appropriate valve 19 may be used for maintaining the pressure of the feed treater 15 during the heating phase, stream 44 (e.g., a pressure supply stream) having appropriate valve 43 may be used for maintaining the pressure of the recycle treater 40 during the heating phase, and stream 48 (e.g., a pressure supply stream) having appropriate valve 49 may be used for maintaining the pressure of the recycle treater 45 during the heating phase. For maintaining the pressure of the off-line treater being regenerated, pressurized nitrogen gas may be used.

The regenerating gas together with one or more impurities of the desiccant flows from the off-line treater being regenerated in a regenerating effluent stream to a separator 60. For feed treater 10, the regenerating effluent stream is defined by streams 104, 210, 216, and 230. For feed treater 15, the regenerating effluent stream is defined by streams 108, 212, 216, and 230. For recycle treater 40, the regenerating effluent stream is defined by streams 220 and 230. For recycle treater 45, the regenerating effluent stream (as illustrated in FIG. 1) is the flow path defined by streams 222 and 230.

In the step of separating the regenerating effluent stream, the separator 60 separates the components of the regenerating effluent stream into an impurity stream 234 and a regenerating recycle stream 232. The separator 60 may be a condenser which is configured to cool the components of the regenerating effluent stream such that at least one of the components condenses and separates or so as to yield the impurity stream and the regenerating recycle stream.

For example, in embodiments where the one or more impurities in the regenerating effluent stream include water, the gaseous diluent (optionally also with unreacted monomer, unreacted comonomer, or both) and water vapor may condense in separator 60 to for the liquid phase of water and the liquid phase of diluent (optionally also with unreacted monomer, unreacted comonomer, or both). The liquid phase of water and the liquid phase of diluent may phase separate from one another. It is contemplated that other impurities may dissolve and separate from the diluent with the water. It is also contemplated that any unreacted monomer and any unreacted comonomer may dissolve in the diluent liquid phase and separate from water with the liquid diluent. In an embodiment, the separator 60 and heater 50 may include the same device which is a cross exchanger which allows the hot gaseous components of the regenerating effluent stream to heat the treated recycle components flowing from the treated recycle stream 160 (and for the treated recycle components to cool the gaseous components of the regenerating effluent stream). The one or more phase-separated impurities may flow from the separator 60 via stream 234 into a knockout pot 80, where impurities may be flared via stream 240 or may flow from the knockout pot 80 via stream 241 for waste disposal (e.g., wastewater disposal). Appropriate equipment may be included in the regenerating recycle stream such that the temperature and pressure of the liquid phase diluent flowing therein is appropriate for flow to the recycle treater 40 and/or 45.

In other embodiments, the separator 60 may separate the one or more impurities which are lighter than the gaseous diluent by condensing the diluent to a liquid phase while the one or more impurities remain in the gaseous phase. In yet other embodiments, the separator 60 may separate the one or more impurities (e.g., water) which are heavier than the gaseous diluent by condensing the water vapor to the liquid phase of water while the diluent (optionally, also any unreacted monomer and any unreacted comonomer) remains in the gaseous phase. In such embodiments, the gaseous phase diluent may be condensed, compressed, or both to a liquid phase for recycle to the recycle treaters 40 and/or 45, or the gaseous phase diluent may flow to the recycle treater 40 and/or 45 without further equipment processing.

In the step of recycling, the gaseous phase of diluent (optionally also unreacted monomer, unreacted comonomer, or both) recovered from the separator 60 is recycled back to one or both of recycle treaters 40 and 45 which are on-line. For example, the flow path which is stream 232, valve 237, stream 236, and stream 152 defines the regenerating recycle stream which recycles the components recovered from the separator 60 to the recycle treater 40. The flow path which is stream 232, valve 239, stream 238, and stream 156 defines the regenerating recycle stream which recycles the components recovered from the separator 60 to the recycle treater 45. Recycling the components used to regenerate an off-line treater to one or both of recycle treaters 40 and 45 which are on-line accounts for any residual impurities that remain in the liquid diluent after separation in separator 60. In such embodiments, the recycle treater 40 and/or 45 may remove residual impurities from the components of the regenerating recycle stream which are introduced to said recycle treater 40 and/or 45.

In embodiments, the heating phase may be performed in the absence of nitrogen.

Once the temperature of regeneration is reached in the off-line treater being regenerated, the method of regenerating the desiccant in the off-line treater may enter a holding phase followed by a cooling phase, the method may enter directly to the cooling phase without a holding phase, or the method may enter into the cooling phase followed by a holding phase.

In the holding phase before the cooling phase, the temperature of the off-line treater being regenerated may be maintained at the regeneration temperature for a period of time. For example, the temperature may be maintained for about 0.25, 0.5, 1, 2, 3, 4, 5, 6, 7, 8, 9, or more hours. During the holding phase, the regenerating gas may continue to pass though the desiccant and out of the off-line treater, or flow of the regenerating gas through the off-line treater may be stopped. In embodiments of the holding phase which continue the flow of regenerating gas through the off-line treater, heating of the treated recycle components in heater 50 may continue in order to maintain the temperature of the off-line treater at the regenerating temperature.

In a cooling phase which is performed directly after the heating phase or after the holding phase, the method for regenerating the off-line treater includes thermosyphoning the regenerating gas, nitrogen, an olefin-free diluent, or combinations thereof in a closed-convection loop of the off-line treater to cool the off-line treater to a temperature in the range of about 150° F. (66° C.) to about 400° F. (204° C.).

To begin the cooling phase of regenerating the off-line treater, the flow of regenerating gas is stopped, said off-line treater is blocked-in, and the closed-convection loop is opened. To stop the flow of regenerating gas to the feed treater 10 which is off-line, valve 207 is actuated to the closed position. To block-in the feed treater 10, valve 211 is also actuated to the closed position, making all valves in streams entering and exiting the feed treater 10 set to the closed position (valves 103 and 105 having previously been closed). To open the closed-convection loop 12 of the feed treater 10, valve 27 is actuated to the open position. The flow of regenerating gas to feed treater 15 is similarly stopped by actuating valve 205 to the closed position, said feed treater 15 is similarly blocked-in by actuating valve 213 to the closed position, and the closed-convection loop 16 of the feed treater 15 is opened by actuating value 21 to the open position. Likewise, the flow of regenerating gas to recycle treater 40 is stopped by actuating valve 261 to the closed position, said recycle treater 15 is blocked-in by actuating valve 221 to the closed position, and the closed-convection loop 42 of the recycle treater 40 is opened by actuating valve 23 to the open position. Finally, the flow of regenerating gas to recycle treater 45 is similarly stopped by actuating valve 159 to the closed position, said recycle treater 45 is similarly blocked-in by actuating value 223 to the closed position, and the closed-convection loop 46 of the recycle treater 45 is opened by actuating valve 25 to the open position.

Each closed-convection loop 12, 16, 42, and 46 of treater 10, 15, 40, and 45 includes a cooler 11, 17, 41, and 47, respectively. In the embodiment illustrated in FIG. 1, the coolers 11, 17, 41, and 47 are finned air coolers, although any acceptable cooler may be used in accordance with the present disclosure. Generally, each closed-convection loop 12, 16, 42, and 46 has an end connected to the top and an end connected to the bottom of the treater 10, 15, 40, and 45, respectively. Each cooler 11, 17, 41, 47 is positioned in the closed-convection loop 12, 16, 42, 46 proximate the end which is connected to the top of the treater 10, 15, 40, 45.

For feed treaters 10 and 15, nitrogen or the regenerating gas can be used in thermosyphoning whichever one of the feed treaters 10 or 15 is off-line. For purposes of efficiency, the feed treater 10 is discussed with the intention that the same thermosyphoning technique applies to feed treater 15.

In embodiments which use nitrogen for thermosyphoning the feed treater 10, nitrogen is added to the feed treater 10 via stream 14 (e.g., a nitrogen supply stream) and valve 13. In embodiments which use nitrogen, the regenerating gas can be previously removed from the feed treater 10 before blocking-in the feed treater 10. The nitrogen is drawn out of the top of the feed treater 10 into the closed-convection loop 12. The nitrogen experiences convective cooling in the cooler 11, and natural convection causes the cooled nitrogen to flow further into the closed-convection loop 12 until the cooled nitrogen flows back into the bottom of the feed treater 10. The cooled nitrogen which enters the bottom of the feed treater 10 from the closed-convection loop 12 is heated by the cooling desiccant, which causes the nitrogen to warm and rise to the top of the feed treater 10, where flow through the closed-convection loop 12 is repeated. Circulation of nitrogen through the closed-convection loop 12 occurs due to temperature gradients in the off-line treater 10. Circulation may be stopped when the temperature of the feed treater 10 (e.g., measured in the desiccant therein or as the nitrogen temperature at a point in the treater 10 or in the closed-convection loop 12) reaches a cooled temperature in the range of 150° F. (66° C.) to 400° F. (204° C.). The pressure of the feed treater 10 (which is off-line) can be maintained during thermosyphoning with nitrogen through nitrogen pressure supplied via stream 14 (e.g., a nitrogen pressure supply stream).

In embodiments which use the regenerating gas for thermosyphoning the feed treater 10, the regenerating gas remaining in the feed treater 10 after stopping the regenerating gas flow and blocking-in of the feed treater 10 is drawn out of the top of the feed treater 10 into the closed-convection loop 12. The regenerating gas experiences convective cooling in the cooler 11, and natural convection causes the cooled regenerating gas to flow further into the closed-convection loop 12 until the cooled regenerating gas flows back into the bottom of the feed treater 10. The cooled regenerating gas which enters the bottom of the feed treater 10 from the closed-convection loop 12 is heated by the cooling desiccant, which causes the regenerating gas to warm and rise to the top of the feed treater 10, where flow through the closed-convection loop 12 is repeated. Circulation of the regenerating gas through the closed-convection loop 12 occurs due to temperature gradients in the off-line treater 10. Circulation may be stopped when the temperature of the feed treater 10 (e.g., measured in the desiccant therein or as the regenerating gas temperature at a point in the treater 10 or in the closed-convection loop 12) reaches a cooled temperature in the range of 150° F. (66° C.) to 400° F. (204° C.). In an embodiment, use of the regenerating gas for thermosyphoning the feed treater 10 may be in the absence of nitrogen.

For recycle treaters 40 and 45, nitrogen, the regenerating gas, olefin free diluent, or combinations thereof can be used in thermosyphoning whichever one of the recycle treaters 40 or 45 is off-line. For purposes of efficiency, the recycle treater 40 is discussed with the intention that the same thermosyphoning technique applies to recycle treater 45.

In embodiments which use nitrogen for thermosyphoning the recycle treater 40, nitrogen is added to the recycle treater 40 via stream 44 (e.g., a nitrogen supply stream) and valve 43. In embodiments which use nitrogen, the regenerating gas can be previously removed from the recycle treater 40 before blocking-in the recycle treater 40. The nitrogen is drawn out of the top of the recycle treater 40 into the closed-convection loop 42. The nitrogen experiences convective cooling in the cooler 41, and natural convection causes the cooled nitrogen to flow further into the closed-convection loop 42 until the cooled nitrogen flows back into the bottom of the recycle treater 40. The cooled nitrogen which enters the bottom of the recycle treater 40 from the closed-convection loop 42 is heated by the cooling desiccant, which causes the nitrogen to warm and rise to the top of the recycle treater 40, where flow through the closed-convection loop 42 is repeated. Circulation of nitrogen through the closed-convection loop 42 occurs due to temperature gradients in the off-line treater 40. Circulation may be stopped when the temperature of the recycle treater 40 (e.g., measured in the desiccant therein or as the nitrogen temperature at a point in the treater 40 or in the closed-convection loop 42) reaches a cooled temperature in the range of 150° F. (66° C.) to 400° F. (204° C.). The pressure of the recycle treater 40 (which is off-line) can be maintained during thermosyphoning with nitrogen through nitrogen pressure supplied via stream 44 (e.g., a nitrogen pressure supply stream).

In embodiments which use the regenerating gas for thermosyphoning the recycle treater 40, the regenerating gas remaining in the recycle treater 40 after stopping the regenerating gas flow and blocking-in of the recycle treater 40 is drawn out of the top of the recycle treater 40 into the closed-convection loop 42. The regenerating gas experiences convective cooling in the cooler 41, and natural convection causes the cooled regenerating gas to flow further into the closed-convection loop 42 until the cooled regenerating gas flows back into the bottom of the recycle treater 40. The cooled regenerating gas which enters the bottom of the recycle treater 40 from the closed-convection loop 42 is heated by the cooling desiccant, which causes the regenerating gas to warm and rise to the top of the recycle treater 40, where flow through the closed-convection loop 42 is repeated. Circulation of regenerating gas through the closed-convection loop 42 occurs due to temperature gradients in the off-line treater 40. Circulation may be stopped when the temperature of the recycle treater 40 (e.g., measured in the desiccant therein or as the regenerating gas temperature at a point in treater 40 of in the closed-convection loop 42) reaches a cooled temperature in the range of 150° F. (66° C.) to 400° F. (204° C.). In an embodiment, use of the regenerating gas for thermosyphoning the recycle treater 40 may be in the absence of nitrogen.

In embodiments which use a combination of nitrogen, the regenerating gas, and olefin-free diluent for thermosyphoning, two stages are performed. First, nitrogen, the regenerating gas, or both is thermosyphoned in the closed-convection loop 42 of the recycle treater 40 as described above to cool the recycle treater 40 to a first temperature of about 350° F. (about 177° C.). Second, an olefin-free diluent (e.g., obtained from product recovery system 30) is introduced into the recycle treater 40 and then thermosyphoned in the closed-convection loop 42 of the recycle treater 40 in a manner similar to that described above for the regenerating gas and nitrogen to cool the recycle treater 40 from the first temperature to the a second temperature of about 150° F. (about 66° C.). In an embodiment of the second stage, the regenerating gas and/or the nitrogen used in thermosyphoning is removed such that the olefin-free diluent is the predominant (e.g., greater than 95, 96, 97, 98, 99, or more vol % of the treater 40) regenerating material in the recycle treater 40 in the second stage of the cooling phase.

In the holding phase after the cooling phase, the temperature of the off-line treater being regenerated may be maintained at the cooled temperature for a period of time. For example, the temperature may be maintained for less than 1 hour, or for about 1, 2, 3, 4, 5, 6, 7, 8, 9, 10, 11, 12, 13, 14, 15, 16, 17, 18, 19, 20 or more hours.

Utilization of thermosyphoning in combination with a cooler in the closed-convection loop reduces the cooling time for the cooling phase.

Regeneration of treaters 10, 15, 40, and 45 reduces the amount of the one or more impurities in the treaters 10, 15, 40, and 45. Embodiments contemplate the amount of impurities may be measured and monitored in stream 104 for feed treater 10, in stream 108 for feed treater 15, in stream 154 for recycle treater 40, and in stream 158 for recycle treater 45. Monitoring and measuring of the impurities enables regeneration for a time sufficient to reduce the impurities in the regenerating effluent stream passing stream 104, 108, 154, or 158 to a desired level (e.g., less than 100, 90, 80, 70, 60, 50, 40, 30, 20, 10, 9, 8, 7, 6, 5, 4, 3, 2, 1, or less ppm based on weight of the regenerating effluent stream). Impurity levels may be measured using techniques known in the art with the aid of this disclosure, for example, high performance liquid chromatography (HPLC), gas chromatography (GC), or Raman spectroscopy. The impurities may be measured in an online apparatus in streams 104, 108, 150, and/or 154, or a sample may be taken from any of streams 104, 108, 154, and/or 158 and subsequently analyzed for impurity concentration.

After regeneration, the off-line treater remains in stand-by mode until the other of the pair of treaters needs regeneration. Alternatively, after regeneration, the off-line treater is brought on-line without any stand-by. To take treater 10 on-line, valves 103 and 105 are actuated to the open position. To take treater 15 on-line, valves 107 and 109 are actuated to the open position. To take treater 40 on-line, valves 153, 155, and 237 are actuated to the open position. To take treater 45 on-line, valves 157, 159, and 239 are actuated to the open position.

Utilizing at least a portion of the treated recycle stream as the regenerating gas in at least part of the regeneration process (e.g., in the heating phase, a holding phase, the cooling phase, or combinations thereof) of a treater reduces the amount of nitrogen needed for regeneration and utilizes an already existing supply of regenerating material (e.g., the treated recycle components) for regenerating treaters. Using less nitrogen reduces the nitrogen supply burden needed for modern polyolefin production processes, which saves costs and frees nitrogen supply for other uses in the polyolefin production process. Moreover, using less nitrogen results in fewer $NO_x$ emissions at the flare since the treated recycle components (which are recycled to the recycle treaters 40 and 45 and not flared) can be used in place of nitrogen for regeneration. Further utilizing the existing supply of treated recycle components for regeneration eliminates any cost for obtaining regenerating materials.

Figure 2:
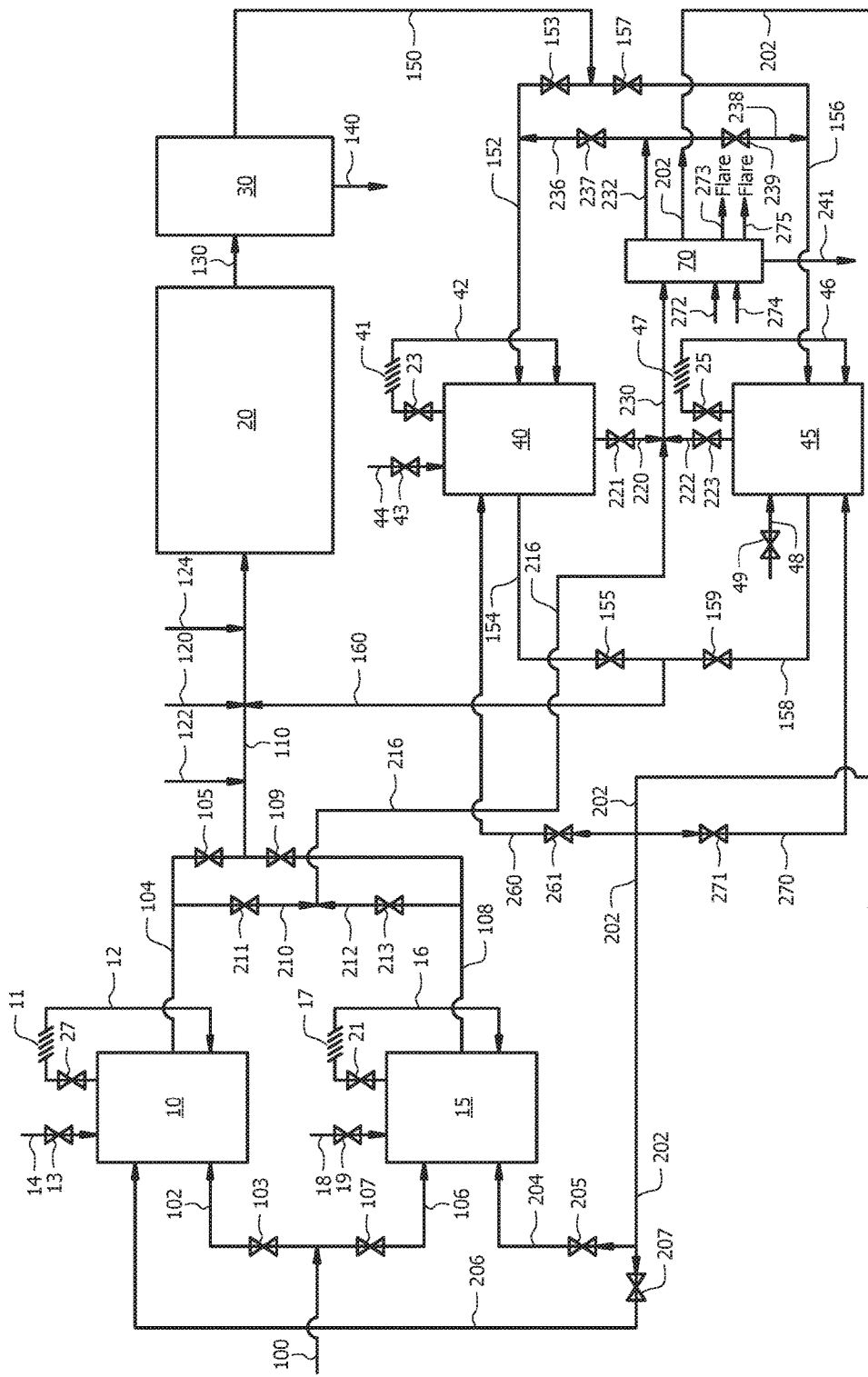
FIG. 2 illustrates a process flow diagram of an aspect of another polyolefin production process which utilizes treaters for feed and recycle streams according to the disclosure.

Referring to FIG. 2, there is shown a process flow diagram of another aspect of a polyolefin production process which has a pair of feed treaters 10 and 15 for a feed stream 100, a polymerization zone 20, a product recovery system 30, a pair of recycle treaters 40 and 45 for a recycle stream 150; and a treater regeneration system 70. FIG. 2 displays a configuration of a polyolefin production system that can be used for carrying out a polyolefin production process as disclosed herein.

Figure 3:
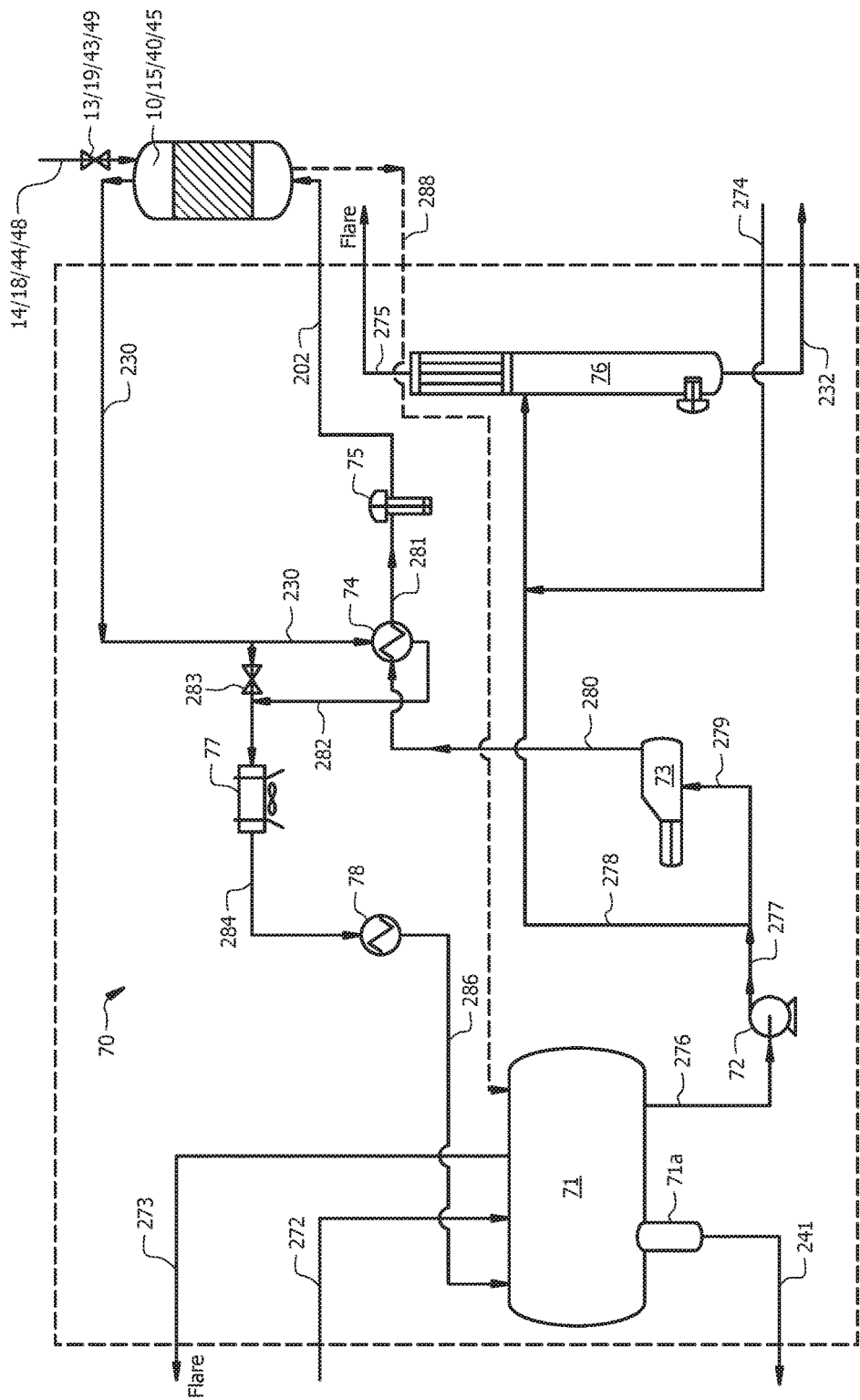
FIG. 3 illustrates a configuration of a treater regeneration system in a polyolefin production process which utilizes treaters for feed and recycle streams according to the disclosure.

Referring to FIG. 3, there is shown a configuration of a treater regeneration system 70, wherein the treater regeneration system 70 can comprise a treater 10, 15, 40, or 45; a decanter 71; a pump 72; a vaporizer 73; a cross exchanger 74; an electric heater 75; a stripper 76; an airfin cooler 77; and a cooling water condenser 78.

In the polyolefin production systems disclosed herein, various system components can be in fluid communication via one or more conduits (e.g., pipes, tubing, flow lines, etc.) suitable for the conveyance of a particular stream, for example as shown in detail by the numbered streams in FIGS. 1, 2, and 3. For purposes of the disclosure herein, the description of a particular component (e.g., stream, vessel, reactor, section, system, or any component thereof) present, referenced, or both in one or more Figures is generally applicable across any Figures where the component is present, referenced, or both, unless stated otherwise. For example, the description of the feed treaters 10, 15 or any components thereof is applicable to any of the FIGS. 1, 2, and 3, unless stated otherwise. As another example, the description of the recycle treaters 40, 45 or any components thereof is applicable to any of the FIGS. 1, 2, and 3, unless stated otherwise.

The disclosure contemplates that the polyolefin production process shown in FIG. 2, the treater regeneration system shown in FIG. 3, or both can include equipment such as storage tanks (e.g., for storing monomer, comonomer, diluent, and catalyst), accumulators, valves, pipes, pumps, heat exchangers, agitators, injection apparatus, flow meters, measurement equipment, control system, or combinations thereof which are not illustrated in FIG. 2, FIG. 3, or both for purposes of clarity.

After the treater 10, 15, 40, or 45 is taken off-line, and depressurized, as described for each treater 10, 15, 40, and 45 above; and fluidly connected (to the regenerating stream 202 and to the respective flow path which is the regenerating effluent stream, as described for each treater 10, 15, 40, and 45 below) for regeneration according to the configuration of the polyolefin production system displayed in FIG. 2; the process of regenerating the desiccant therein can commence.

To fluidly connect the feed treater 10 which is off-line for regeneration, valves 207 and 211 are actuated to the open position such that the off-line feed treater 10 is fluidly connected to a regenerating stream 202 (via streams 202 and 206) and to a flow path which is the regenerating effluent stream (which, in FIG. 2, is the flow path defined by streams 104, 210, 216, and 230). To fluidly connect the feed treater 15 which is off-line for regeneration, valves 205 and 213 are actuated to the open position such that the off-line feed treater 15 is fluidly connected to the regenerating stream 202 (via streams 202 and 204) and to a flow path which is the regenerating effluent stream (which, in FIG. 2, is the flow path defined by streams 108, 212, 216, and 230). To fluidly connect the recycle treater 40 which is off-line for regeneration, valves 261 and 221 are actuated to the open position such that the off-line recycle treater 40 is fluidly connected to the regenerating stream 202 (via streams 202 and 260) and to a flow path which is the regenerating effluent stream (which, in FIG. 2, is the flow path defined by streams 220 and 230). To fluidly connect the recycle treater 45 which is off-line for regeneration, valves 271 and 223 are actuated to the open position such that the off-line recycle treater 45 is fluidly connected to the regenerating stream 202 (via streams 202 and 270) and to a flow path which is the regenerating effluent stream (which, in FIG. 2, is the flow path defined by streams 222 and 230).

The regenerating stream (which, in FIG. 3, is the flow path defined by streams 276, 277, 279, 280, 281, and 202) can comprise a regenerating medium, wherein the regenerating medium can comprise a diluent, such as an olefin-free diluent, the diluent from the treated recycle stream, or combinations thereof; and an impurity (e.g., of the one or more impurities discussed herein). The diluent can be introduced to the treater regeneration system 70 via diluent makeup stream 272. For example, the diluent makeup stream 272 can be fed to the decanter 71 by using a level control system, as disclosed herein. The diluent makeup stream 272 accounts for diluent losses during the process of regenerating the desiccant, for example via streams 278, 273, 241, or combinations thereof. In some aspects, the impurity present in the regenerating stream can be carbon dioxide ($CO_2$).

The process of regenerating the desiccant can be divided into phases: a heating phase, a cooling phase, a holding phase, or combinations thereof. In an aspect, the heating phase can be followed by the cooling phase. As will be appreciated by one of skill in the art, and with the help of this disclosure, the process of regenerating the desiccant is a cyclical process that repeats a heating phase, a cooling phase, a holding phase, or combinations thereof, as necessary to regenerate treaters. For purposes of the disclosure herein, the term "regeneration cycle" refers to a heating phase, a cooling phase, and an optional holding phase, that are consecutive. Each regeneration cycle can only have one heating phase and one cooling phase, but can have more than one holding phase, as necessary to achieve a suitable regeneration of the treater.

In an aspect, the heating phase can comprise heating a regenerating stream comprising a regenerating medium, such as a diluent, and introducing the regenerating stream to the off-line treater, such as treater 10, 15, 40, or 45. In some aspects, the regenerating medium can comprise a diluent in a liquid phase, a diluent in a gaseous phase, or a diluent in both a liquid phase and a gaseous phase. In an aspect, the diluent can be propane, butane, isobutane, pentane, isopentane, hexane, heptane, and the like, or combinations thereof.

In some aspects, the heating phase can be performed in the absence of nitrogen, e.g., the regenerating medium excludes nitrogen.

The regenerating stream can be recovered as an effluent stream 276 from the decanter 71. The regenerating stream 276 can be characterized by a decanter operating pressure (e.g., about 100 psig or 0.69 MPag) and by a decanter operating temperature (e.g., ambient temperature; about 100° F. (37.8° C.)). The regenerating stream can be pumped with the use of a regeneration circulation pump, such as pump 72, from the decanter 71 to the vaporizer 73, for example via a flow path defined by streams 277 and 279. A portion 279 of stream 277 can be fed to the vaporizer 73.

The pump 72 can help prevent accumulation of liquid in the decanter 71, for example when a regenerating effluent stream that is recovered from the off-line treater 10, 15, 40, or 45 is cooled and condensed into a liquid which is further introduced to the decanter 71 (e.g., via a flow path defined by streams 230, 282, 284, and 286). The pump 72 can pull stream 276 from the decanter 71 on a suction side of the pump, and discharge stream 277 on a discharge side of the pump.

In some aspects, the pump 72 can have American Petroleum Institute (API) compliant design. The pump 72 can comprise a flange on the suction side of the pump, and a flange on the discharge side of the pump, wherein each of the flanges can be rated for pressures up to about 600 psig (4.14 MPag). In some aspects, the pump 72 can comprise carbon steel as a material of construction. As will be appreciated by one of skill in the art, and with the help of this disclosure, housing design pressure for pump 72 should match the decanter 71 design pressure. In some aspects, the pump 72 can be a low head centrifugal pump. The pump 72 can be equipped with a minimum flow protection loop.

As will be appreciated by one of skill in the art, and with the help of this disclosure, the pump 72 can be sized to allow for excess flow (e.g., surplus capacity) of diluent that can already be present in the desiccant bed at the beginning of the regeneration cycle, which diluent can be removed from the off-line treater via stream 230 and condensed during the regeneration cycle. Further, as will be appreciated by one of skill in the art, and with the help of this disclosure, condensers and pumps in treater regeneration system 70 can be sized to handle a flow larger than an actual circulation rate, to account for the vaporization of liquid diluent present in the desiccant bed at the start of the regeneration cycle.

An effluent stream 277 from the pump can provide both for a stream 279 that can be fed to the vaporizer 73, and for a stream 278 that can be fed to the stripper 76. As will be appreciated by one of skill in the art, and with the help of this disclosure, a portion 278 of the stream 277 that is bled to the stripper 76 can allow for decanter 71 inventory control, and could further help prevent accumulation of liquid in the decanter 71. In an aspect, the flow of portion 278 (relative to portion 279) of the regenerating stream can be controlled by flow control from a decanter level control of the decanter 71.

In some aspects, the portion 278 of the regenerating stream can comprise from about 1% to about 20%, alternatively from about 5% to about 15%, alternatively from about 7.5% to about 12.5%, or alternatively about 10% of the regenerating stream, based on a total flow rate of the regenerating stream.

In some aspects, impurities, such as $CO_2$, can be present in the regenerating effluent stream 230 that is recovered from the off-line treater 10, 15, 40, or 45 and sent to the decanter 71. Without wishing to be limited by theory, certain impurities (e.g., $CO_2$) are not soluble enough in water to be removed with the water in stream 241 in sufficient quantities to prevent buildup of impurities in the regenerating stream. As will be appreciated by one of skill in the art, and with the help of this disclosure, the portion 278 of the regenerating stream that is sent to the stripper 76 can help prevent buildup of impurities in the regenerating stream.

In an aspect, the portion 278 of the regenerating stream can be sent to the stripper 76 during the heating phase, the holding phase, or both for each of the off-line treater 10, 15, 40, or 45. Without wishing to be limited by theory, provided that the impurities (e.g., $CO_2$) have been substantially removed or rejected from the regenerating stream (e.g., from the diluent) during the heating phase, and during the optional holding phase, it is not necessary to send the portion 278 of the regenerating stream to the stripper 76 during the cooling phase, as there would be no concern of buildup of impurities in the regenerating stream during the cooling phase. As will be appreciated by one of skill in the art, and with the help of this disclosure, the composition of streams 277, 278, and 279 is the same as the composition of stream 276, as pumping a stream, splitting a stream, or both does not alter the composition of a stream, it simply provides for circulating a particular stream or portion thereof within a system, such as the polyolefin production systems disclosed herein. Further, as will be appreciated by one of skill in the art, and with the help of this disclosure, the stripper 76 can be sized to account for a higher flow rate of stream 278 during the heating phase, and during the optional holding phase. In some aspects, the stripper 76 can be sized to provide for a sufficient surge volume to hold excess liquid inventory from regenerating treaters, such as liquid diluent present in the desiccant bed at the start of the regeneration cycle.

In an aspect, excess regenerating medium (e.g., diluent) that is conveyed via stream 278 during the heating phase, holding phase, or both can be returned to a diluent regeneration system (e.g., isobutane regeneration system) via stream 232 that can be fed to a deethanizer. In some aspects, the product recovery system 30 can comprise a diluent regeneration system, wherein the diluent regeneration system can comprise the deethanizer that can receive stream 232. Generally, gases that are separated from a polyolefin product in the product recovery system 30 can be introduced to the diluent regeneration system, wherein the diluent regeneration system can comprise one or more fractionation vessels to recover the diluent for recycle to the polymerization zone, as previously described herein. The one or more fractionation vessels of the diluent regeneration system can comprise a deethanizer, a dehexanizer, or both. Further, as will be appreciated by one of skill in the art, and with the help of this disclosure, the deethanizer can be sized to allow for processing excess flow of regenerating medium via stream 278 during the heating phase, holding phase, or both, in order to avoid flooding the deethanizer.

In an aspect, the portion 278 of the regenerating stream can be separated in the stripper 76 into an impurity stream 275 comprising the impurity and a process recycle stream (e.g., a regenerating recycle stream) 232 comprising the regenerating medium. The impurities separated from the regenerating medium (e.g., diluent) in the stripper 76 can be flared via stream 275. The regenerating recycle stream 232 can be recycled to an on-line treater as previously described herein. In some aspects, fresh diluent can be further introduced to the stripper 76, for example via stream 274 (as shown in the configuration of FIG. 3), to provide for the necessary amount of diluent in the regenerating recycle stream 232. Appropriate equipment may be included in the regenerating recycle stream such that the temperature and pressure of the liquid phase diluent flowing therein is appropriate for flow to the on-line treater.

In an aspect, the regenerating recycle stream 232 can be fed to the deethanizer. In other aspects, the regenerating recycle stream 232 can be fed to a dehexanizer. In some aspects, the product recovery system 30 can comprise a diluent regeneration system, wherein the diluent regeneration system can further comprise the dehexanizer that can receive stream 232. Depending on the configuration of the product recovery system 30, recycle stream 150 can comprise recycle diluent (e.g., recycle isobutane), olefin-free diluent (e.g., olefin-free isobutane), or both.

The stripper 76 can be a degassing stripper. In some aspects, the degassing stripper 76 can comprise a cascade-type column, wherein stream 278 enters the column and falls down (e.g., cascades) over a large surface area (e.g., as compared to an area inside a conduit used to convey stream 278 to stripper 76), thereby providing for a large surface area for the impurity (e.g., $CO_2$) to diffuse from the regenerating medium (e.g., diluent) into the atmosphere surrounding the regenerating medium inside the stripper 76, and wherein such atmosphere has a lower concentration of the impurity than the regenerating medium entering the striper 76 via stream 278.

In a polyolefin production system, such as a polyethylene production system, that comprises a diluent degassing column or stripper for degassing fresh diluent, stream 278 can be conveyed to such diluent degassing column, e.g., such diluent degassing column could be upstream of stream 122, for example to provide for degassing stream 122. In a polyolefin production system that does not have a fresh diluent degassing column, a degassing stripper can be added in a diluent regeneration system, for example upstream of a deethanizer or lights column feed entry. In some aspects, the product recovery system 30 can comprise a diluent regeneration system, wherein the diluent regeneration system can further comprise a deethanizer or lights column feed entry that can receive stream 232, wherein the diluent regeneration system further comprises a degassing stripper located upstream of the deethanizer or lights column, and wherein stream 278 can be fed to such degassing stripper.

In an aspect, heating a regenerating stream comprising a regenerating medium, such as a diluent, can comprise feeding the portion 279 of the stream 277 to the vaporizer 73 to produce a regenerating stream 280, wherein a temperature of stream 280 is increased when compared to the temperature of streams 276, 277. The vaporizer 73 can heat the regenerating stream from ambient temperature to a first temperature of the regenerating stream, wherein the first temperature of the regenerating stream can be from about 135° F. (57.2° C.) to about 155° F. (68.3° C.), alternatively from about 140° F. (60° C.) to about 150° F. (66° C.), or alternatively about 146° F. (63.3° C.). The regenerating stream can be characterized by a pressure of about 115 psig (0.79 MPag). As will be appreciated by one of skill in the art, and with the help of this disclosure, the composition of stream 280 is the same as the composition of stream 279, as heating or vaporizing a stream via vaporizer 73 as disclosed herein does not alter the composition of such stream, although some components of the stream might change the phase they are present in, e.g., at least a portion of the diluent might change from a liquid phase to a vapor phase.

In an aspect, the vaporizer 73 can be a low pressure steam vaporizer. The vaporizer 73 can operate at a pressure of about 120 psig (0.83 MPag). In some aspects, the vaporizer 73 can be configured to vaporize (e.g., convert diluent from a liquid phase to a vapor phase) the regenerating medium in the regenerating stream by increasing the temperature of the regenerating stream from ambient temperature to saturated vapor temperature at outlet pressure (e.g., about 146° F. (63.3° C.) at about 115 psig (0.79 MPag)). In some aspects, the vaporizer 73 can comprise carbon steel as a material of construction.

In an aspect, heating a regenerating stream comprising a regenerating medium, such as a diluent, can comprise feeding the stream 280 to the cross exchanger 74 to produce a regenerating stream 281, wherein a temperature of stream 281 is increased when compared to the temperature of stream 280. The cross exchanger 74 can heat the regenerating stream from the first temperature of the regenerating stream to a second temperature of the regenerating stream, wherein the cross exchanger 74 uses the regenerating effluent stream 230 to heat the regenerating stream to the second temperature, and wherein the second temperature of the regenerating stream can be within about 30° F. (16.7° C.), alternatively within about 25° F. (13.9° C.), or alternatively within about 20° F. (11.1° C.) of a temperature of the regenerating effluent stream 230. The cross exchanger 74 allows hot gaseous components of the regenerating effluent stream 230 to heat the regenerating medium flowing from stream 280 (and for the regenerating medium flowing from stream 280 to cool the gaseous components of the regenerating effluent stream 230). As will be appreciated by one of skill in the art, and with the help of this disclosure, the composition of stream 281 is the same as the composition of stream 280, as heating a stream via cross exchanger 74 as disclosed herein does not alter the composition of such stream, although some components of the stream might change the phase they are present in, e.g., at least a portion of the diluent might change from a vapor phase into a gas phase.

In an aspect, a temperature of the regenerating effluent stream 230 can be from about 165° F. (73.9° C.) to about 550° F. (288° C.), alternatively from about 175° F. (79.4° C.) to about 525° F. (274° C.), or alternatively from about 200° F. (93.3° C.) to about 500° F. (260° C.). The temperature of the regenerating effluent stream 230 can vary depending on which treater is being regenerated (e.g., feed treater versus recycle treater) and the progress of the regeneration cycle for the particular off-line treater vessel being regenerated.

In some aspects, the cross exchanger 74 can be configured to allow for heat exchange between a cold stream (e.g., stream 280) having a temperature of from about 147° F. (63.9° C.) to about 530° F. (277° C.), and a hot stream (e.g., regenerating effluent stream 230) having a temperature of from about 550° F. (288° C.) to about 167° F. (75° C.). In some aspects, the cross exchanger 74 can comprise carbon steel as a material of construction.

In some aspects, regenerating effluent stream 230 can bypass the cross exchanger 74 (e.g., via valve 283) while an off-line treater outlet temperature (e.g., a temperature of the regenerating effluent stream 230) is less than about 150° F. (65.6° C.). Once the off-line treater outlet temperature has exceeded about 150° F. (65.6° C.) for a period of time (e.g., equal to or greater than 15 minutes, 30 minutes, 60 minutes, 75 minutes, or more), the valve 283 can be actuated to the closed position, and the regenerating effluent stream 230 can be directed to the cross exchanger 74. As will be appreciated by one of skill in the art, and with the help of this disclosure, the regenerating effluent stream 230 can have another valve (not shown in FIG. 3) upstream of the cross exchanger 74 that can be actuated to the open position when the stream 230 is intended to flow into the cross exchanger 74 (at which time valve 283 is actuated to the closed position); and to the closed position when the stream 230 is intended to bypass the cross exchanger 74 (at which time valve 283 is actuated to the open position).

In an aspect, heating a regenerating stream comprising a regenerating medium, such as a diluent, can comprise feeding the stream 281 to the electric heater 75 to produce a regenerating stream 202, wherein a temperature of stream 202 is increased when compared to the temperature of stream 281. The electric heater 75 can heat gaseous components (e.g., regenerating gas) in the regenerating stream from the second temperature of the regenerating stream to a third temperature of the regenerating stream (e.g., final regeneration temperature), wherein the third temperature of the regenerating stream can be from about 400° F. (204° C.) to about 600° F. (316° C.), alternatively from about 425° F. (218° C.) to about 575° F. (302° C.), alternatively from about 450° F. (232° C.) to about 550° F. (288° C.), or alternatively from about 500° F. (260° C.) to about 600° F. (316° C.). The temperature of the regenerating stream 202 can vary depending on which treater is being regenerated (e.g., feed treater versus recycle treater). As will be appreciated by one of skill in the art, and with the help of this disclosure, the composition of stream 202 is the same as the composition of stream 281, as heating a stream via electric heater 75 as disclosed herein does not alter the composition of such stream, it simply increases the temperature of the stream components.

In some aspects, the electric heater 75 can be configured to heat saturated regenerating medium vapors to a temperature of up to about 650° F. (343° C.). As will be appreciated by one of skill in the art, and with the help of this disclosure, although temperatures of about 650° F. (343° C.) are not necessarily considered for stream 202, the ability of the electric heater 75 to handle an increased heating duty (e.g., to heat stream 202 to a temperature of up to about 650° F. (343° C.)) can be advantageous when stream 230 bypasses the cross exchanger 74. In some aspects, a housing for the electric heater 75 can comprise carbon steel as a material of construction.

In an aspect, the heating phase can comprise a step of regenerating at least a portion of the desiccant in the off-line treater 10, 15, 40, or 45 using the regenerating medium to yield a regenerating effluent stream 230 comprising the regenerating medium and an impurity. The regenerating effluent stream 230 can further comprise water. The step of regenerating can remove the impurity from the desiccant of the off-line treater with the regenerating medium.

In some aspects, the off-line treater being regenerated can comprise an ethylene treater, a hexene treater, an isobutane treater, an isopentane treater, a pentane treater, or a deethanizer column overhead treater.

In some aspects, the desiccant in the one or more desiccant beds in treaters 10, 15, 40, and 45 can comprise alumina, a zeolite, an alumina-zeolite composite, or any other suitable desiccant disclosed herein. An example of a desiccant suitable for use in the present disclosure include AZ-300 adsorbent, which is a spherical alumina-zeolite composite adsorbent with low reactivity that is commercially available from UOP LLC. As will be appreciated by one of skill in the art, and with the help of tis disclosure, during regeneration of AZ-300 adsorbent desiccant, there is potential for $CO_2$ to be present in the regenerating effluent stream.

The step of regenerating may include introducing the regenerating stream 202 comprising the regenerating gas (e.g., regenerating medium gas, diluent gas) into the off-line treater 10, 15, 40, or 45 being regenerated, and removing an impurity (e.g., of the one or more impurities discussed herein, such as $CO_2$) from the desiccant in the off-line treater with the regenerating gas. In the step of regenerating, the regenerating gas may flow via stream 202 to one of the pair of feed treaters 10 and 15 which is off-line for regeneration, to one of the pair of recycle treaters 40 and 45 which is off-line for regeneration, or both, as previously described herein. In some aspects, the regenerating gas passes through the desiccant in the off-line treater being regenerated from bottom to top. In other aspects, the regenerating gas may flow through the off-line treater from top to bottom. However, and without wishing to be limited by theory, regardless of the direction of the flow of the regenerating gas through the desiccant bed inside the treater being regenerated, the flow of regenerating gas through the desiccant bed can be maintained low enough while still allowing for a uniform flow distribution of the regenerating gas across the bed.

During the heating phase, a temperature of the off-line treater 10, 15, 40, or 45 being regenerated can be increased from a temperature of about 150° F. (66° C.) or lower, to a temperature of regeneration (e.g., about 400° F. (204° C.) to 600° F. (about 316° C.)). While the temperature of the off-line treater 10, 15, 40, or 45 being regenerated is about 150° F. (66° C.) or lower, during the heating phase, a rate of flow of the regenerating medium through the off-line treater can be from about 2% to about 75%, alternatively from about 5% to about 50%, alternatively less than about 50%, alternatively less than about 40%, alternatively less than about 30%, alternatively less than about 29%, alternatively less than about 25%, or alternatively less than about 20%, of a fluidization velocity of the desiccant. As will be appreciated by one of skill in the art, and with the help of this disclosure, the rate of flow of the regenerating medium through the off-line treater should not exceed the fluidization velocity of the desiccant. Until the temperature of the off-line treater 10, 15, 40, or 45 being regenerated rises above about 150° F. (66° C.), the rate of flow of the regenerating medium through the off-line treater must be held low enough to insure no carryover of desiccant into regeneration system piping. Once the temperature of the off-line treater 10, 15, 40, or 45 being regenerated rises above about 150° F. (66° C.), the rate of flow of the regenerating medium through the off-line treater can be increased by about 20%, alternatively about 25%, alternatively about 29%, alternatively about 30%, alternatively about 40%, or alternatively about 50%, of a fluidization velocity of the desiccant.

The regenerating gas passes through the desiccant (e.g., in one or more desiccant beds) of the off-line treater 10, 15, 40, or 45 being regenerated during the heating phase as the temperature increases to the temperature of regeneration, e.g., a temperature in the range of about 400° F. (204° C.) to 600° F. (about 316° C.), or alternatively about 450° F. (about 232° C.) to about 600° F. (about 316° C.). The pressure of the off-line treater may increase as the temperature increases, and the regeneration pressure includes a pressure in the range of about 50 psig (0.34 MPag) to about 850 psig (about 5.86 MPag), about 50 psig (0.34 MPag) to about 700 psig (about 4.83 MPag), about 50 psig (0.34 MPag) to about 600 psig (about 4.14 MPag), about 75 psig (0.52 MPag) to about 400 psig (about 2.76 MPag), about 100 psig (0.69 MPag) to about 200 psig (about 1.38 MPag), about 100 psig (0.69 MPag) to about 150 psig (about 1.03 MPag), or about 120 psig (about 0.83 MPag). Alternatively, the pressure of the off-line treater may be maintained at a regeneration pressure during the heating phase, as previously described herein. For maintaining the pressure of the off-line treater 10, 15, 40, or 45 being regenerated, pressurized nitrogen gas may be used, for example via pressure supply stream 14, 18, 44, or 48, respectively.

In an aspect, the heating phase can comprise a step of decanting the regenerating effluent stream into a water stream 241 comprising the water and the regenerating stream 276 comprising the regenerating medium (e.g., diluent). As illustrated in the configuration of FIG. 3, the regenerating effluent stream flowing to the decanter 71 can be the flow path defined by streams 230, 282, 284, and 286 (when valve 283 is actuated to the closed position); or the flow path defined by streams 230, 284, and 286 (when valve 283 is actuated to the open position). In some aspects, the heating phase can comprise prior to decanting, a step of cooling the regenerating effluent stream.

In an aspect, the step of cooling in the heating phase can comprise cooling the regenerating effluent stream 230 in the cross exchanger 74, wherein the cross exchanger 74 uses the regenerating stream 280 to cool the regenerating effluent stream 230 and produce a regenerating effluent stream 282, as previously described herein. The regenerating effluent stream 282 (e.g., when valve 283 is actuated to the closed position), or the regenerating effluent stream 230 (e.g., when valve 283 is actuated to the open position) can be further cooled in the airfin cooler 77 to a first temperature of the regenerating effluent stream of from about 125° F. (51.7° C.) to about 175° F. (79.4° C.), alternatively from about 140° F. (60° C.) to about 160° F. (71.1° C.), or alternatively about 150° F. (66° C.). As will be appreciated by one of skill in the art, and with the help of this disclosure, the composition of stream 282 is the same as the composition of stream 230, as cooling a stream via cross exchanger 74 as disclosed herein does not alter the composition of such stream, although some components of the stream might change the phase they are present in, e.g., at least a portion of the diluent might change from a gas phase into a vapor phase. Further, as will be appreciated by one of skill in the art, and with the help of this disclosure, the composition of stream 284 is the same as the composition of streams 282 and 230, as cooling a stream via airfin cooler 77 as disclosed herein does not alter the composition of such stream, although some components of the stream might change the phase they are present in, e.g., at least a portion of the diluent might change from a gas phase into a vapor phase.

In aspects where the valve 283 is actuated to the open position (e.g., during early stages of heating phase; during cooling phase), the regenerating effluent stream 230 bypasses the cross exchanger 74, and the airfin cooler 77 can be configured to cool the regenerating effluent stream 230 from the temperature of regeneration (e.g., about 400° F. (204° C.) to 600° F. (about 316° C.)) to a temperature of from about 125° F. (51.7° C.) to about 175° F. (79.4° C.), alternatively from about 140° F. (60° C.) to about 160° F. (71.1° C.), or alternatively about 150° F. (66° C.). In some aspects, the airfin cooler 77 can be equipped with fixed speed fans as well as monitoring of fan motor current to detect belt breakage or motor failure.

In an aspect, the step of cooling in the heating phase can comprise cooling the regenerating effluent stream 284 in a cooling water condenser 78 from the first temperature of the regenerating effluent stream to a second temperature of the regenerating effluent stream (e.g., regenerating effluent stream 286), wherein the second temperature of the regenerating effluent stream can be about the same as the operating temperature of the decanter 71 (e.g., ambient temperature; 100° F. (37.8° C.)), and wherein a pressure of the regenerating effluent stream at the second temperature is about 100 psig (0.69 MPag). As will be appreciated by one of skill in the art, and with the help of this disclosure, the composition of stream 286 is the same as the composition of stream 284, as cooling a stream via cooling water condenser 78 as disclosed herein does not alter the composition of such stream, although some components of the stream might change the phase they are present in, e.g., at least a portion of the diluent might change from a gas phase or a vapor phase into a liquid phase. Further, as will be appreciated by one of skill in the art, and with the help of this disclosure, the cooling water condenser 78 condenses at least a portion of the diluent prior to introducing the regenerating effluent stream to the decanter 71. For example, in aspects where the regenerating effluent stream comprises water, the diluent (optionally also with unreacted monomer, unreacted comonomer, or both) in a gas phase and water vapor can condense in cooling water condenser 78 to form water in a liquid phase and diluent (optionally also with unreacted monomer, unreacted comonomer, or both) in a liquid phase.

In some aspects, the cooling water condenser 78 can be configured to process excess flow (e.g., surplus capacity) of diluent that can already be present in the desiccant bed at the beginning of the regeneration cycle, which diluent can be removed from the off-line treater via stream 230 and condensed during the regeneration cycle.

In an aspect, the cooling water condenser 78 can employ a cooling media comprising cooling tower water. In some aspects, the cooling water condenser 78 can be configured to cool the regenerating effluent stream 284 from the from the first temperature of the regenerating effluent stream to a second temperature of the regenerating effluent stream, wherein the second temperature of the regenerating effluent stream can be within about 20° F. (11.1° C.), alternatively within about 15° F. (8.3° C.), or alternatively within about 10° F. (5.6° C.) of a temperature of the cooling tower water entering the cooling water condenser 78. In some aspects, a temperature of the cooling tower water can increase within about 30° F. (16.7° C.), alternatively within about 25° F. (13.9° C.), or alternatively within about 20° F. (11.1° C.) of a temperature of the cooling tower water entering the cooling water condenser 78.

In an aspect, the regenerating effluent stream 286 can be introduced to the decanter 71 to produce the water stream 241 and the regenerating stream 276. The water in a liquid phase and the diluent in a liquid phase can phase separate from one another in the decanter 71. It is contemplated that some impurities (e.g., impurities other than water, such as $CO_2$) can dissolve and separate from the diluent with the water. It is also contemplated that any unreacted monomer and any unreacted comonomer can dissolve in the diluent liquid phase and separate from water with the liquid diluent.

The water can readily phase separate from the diluents disclosed herein. In some aspects, the water can phase separate from the diluent in the decanter 71 over a time period (e.g., residence time period) of from about 1 minute to about 60 minutes, alternatively from about 5 minutes to about 30 minutes, or alternatively from about 10 minutes to about 20 minutes. Without wishing to be limited by theory, the diluent is characterized by a density that is lower than the water density, and as such the diluent will phase separate from the water and "float" at the top of the water; i.e., the water will form a phase separated bottom layer, and the diluent will form a phase separated liquid layer.

The decanter 71 can have a divider baffle that allows the water to be drained at a bottom of the decanter from a phase separation compartment, and which further allows the diluent to flow over the divider baffle into a diluent compartment that is fluidly connected to the suction side of the pump 72. The divider baffle can be a substantially vertical baffle. Pump 72 pumps the regenerating stream 276 from the diluent compartment at the decanter operating temperature (e.g., ambient temperature; about 100° F. or 37.8° C.) and at the decanter operating pressure (e.g., about 100 psig or 0.69 MPag).

In some aspects, the phase separation compartment can be characterized by a phase separation compartment residence time, and the diluent compartment can be characterized by a diluent compartment residence time, wherein the phase separation compartment residence time is greater than the diluent compartment residence time. The phase separation compartment residence time can be from about 1 minute to about 60 minutes, alternatively from about 5 minutes to about 30 minutes, or alternatively from about 10 minutes to about 20 minutes. The diluent compartment residence time can be from about 1 minute to about 30 minutes, alternatively from about 5 minutes to about 20 minutes, or alternatively from about 10 minutes to about 15 minutes.

The decanter 71 can be configured to operate at a pressure of up to the highest vapor or hydraulic pressure of a treater fluidly connected to the decanter 71, such as treater 10, 15, 40, or 45. The decanter 71 can be configured to operate at a pressure of less than the diluent critical pressure (e.g., less than 95% of the diluent critical pressure). For example, when the diluent is isobutane, the decanter should not operate at a pressure in excess of 475 psig (3.28 MPag).

In some aspects, the decanter 71 can comprise carbon steel as a material of construction. Some of the impurities that are present in the stream 286 have some degree of solubility in water, and present corrosion concerns owing to the acidic nature of their water solutions, such as $CO_2$, nitrogen oxides, etc. The decanter 71 can be configured to provide for corrosion allowance (e.g., ⅛"; ¼"; or ½" corrosion allowance). Without wishing to be limited by theory, when $CO_2$ dissolves in water, carbonic acid can form, which can lead to corrosion.

In some aspects, the decanter 71 can comprise a water boot 71a, wherein the water boot 71a can be located at a bottom of the decanter 71. Generally, a water boot (e.g., water boot 71a) is a small extension compartment situated at a bottom of a phase separation chamber (e.g., decanter 71), wherein the water boot can provide a means for collecting the phase separated bottom layer (e.g., water) and can further allow for controlling a liquid-liquid interface (e.g., diluent-water interface), for example via an interface level. In some aspects, the water boot 71a can be characterized by a volume that is from about 10 vol. % to about 25 vol. %, alternatively from about 12.5 vol. % to about 20 vol. %, or alternatively from about 15 vol. % to about 17.5 vol. %, based on the expected maximum water volume at normal water level in the decanter 71. In some aspects, the water boot can be characterized by a length to diameter (L/D) ratio of from about 1.5:1 to about 2.5:1, or alternatively about 2:1. In some aspects, the water boot 71a can comprise stainless clad, stainless steel, or both as a material of construction, to mitigate any potential corrosion, as some of the phase separated water can be acidic (or highly acidic) owing to dissolved impurities, such as $CO_2$, nitrogen oxides, etc. Water containing impurities (e.g., of the one or more impurities discussed herein, such as $CO_2$) can flow from the decanter 71 through the water boot 71a and via stream 241 for waste disposal (e.g., wastewater disposal). A discharge from the water boot 71a (e.g., stream 241) can be via a closed system (e.g., closed discharge system), either to a flare system, or to a wastewater disposal system suitable for hydrocarbon contaminated water. In some aspects, an interface level can control the discharge of the boot to the closed discharge system.

In some aspects, a conductivity monitor (e.g., electrical conductivity monitor) can be used to monitor the conductivity of the fluids discharged through the water boot 71a and via stream 241, to prevent discharging the diluent phase separated layer (e.g., hydrocarbons) to the closed discharge system (e.g., flare, closed water system). Without wishing to be limited by theory, the diluent is characterized by low conductivity, while the water is characterized by high conductivity. When the conductivity monitor employed in the water boot 71a detects a low conductivity, drain valves associated with the water boot 71a can be actuated to the closed position to prevent discharging the diluent phase separated layer (e.g., hydrocarbons) to the closed discharge system (e.g., flare, closed water system).

In an aspect, the phase separation compartment and the diluent compartment can be equipped with dual level transmitters, to monitor the level of fluids in each compartment. The levels in each compartment of the decanter 71 can be any suitable density based level system, such as sealed capillary level system, magnetic level system, radar level system, or combinations thereof. Vessel drains can be provided on both sides of the divider baffle, to allow for the regenerating stream 276 to flow out of the decanter 71 from the diluent compartment, and for the stream 241 to flow out the of the decanter 71 (e.g., via water boot 71a) from the phase separation compartment. As will be appreciated by one of skill in the art, and with the help of this disclosure, a destination of stream 241 can be chosen based on the contaminants present in stream 241, a pressure differential relative to the destination, or both.

In some aspects, the decanter 71 can have a pressure controlled vent to flare, such as stream 273 that can vent to a flare system. As will be appreciated by one of skill in the art, and with the help of this disclosure, during regeneration of treaters (e.g., feed treaters, recycle treaters), a gas cap can develop in the decanter 71 due to an increased lights content in the regenerating effluent stream. Such increased lights content can comprise a portion of the impurities in stream 286, such as impurity gases that did not dissolve or condense in the cooling water condenser 78, as well as some diluent vapors. Stream 273 can be sent to flare, an isobutane nitrogen recovery unit (INRU) suction knock out pot, a dump tank, a dehexanizer overhead compressor suction, a vent gas to an ethylene cracker, or combinations thereof.

In some aspects, a diluent makeup stream 272 can be further introduced to the decanter 71. Makeup diluent introduced to the decanter via makeup diluent stream 272 can comprise olefin-free diluent (e.g., olefin-free isobutane). As will be appreciated by one of skill in the art and with the help of this disclosure, the use of olefin-free diluent can prevent olefin contamination of the treaters (e.g., feed treaters, recycle treaters). For purposes of the disclosure herein an "olefin-free" diluent (e.g., olefin-free isobutane) refers to a diluent (e.g., isobutane) that can be free of olefins, alternatively, substantially free of olefins, alternatively, essentially free of olefins, or alternatively, consist or consist essentially of non-olefins. For example, olefins can be present in an olefin-free diluent (e.g., olefin-free isobutane) in an amount of less than about 1% by total weight of the olefin-free diluent, alternatively, less than about 0.5%, alternatively, less than about 0.4%, alternatively, less than about 0.3%, alternatively, less than about 0.2%, alternatively, less than about 0.1%, alternatively, less than about 0.05%, or alternatively, less than about 0.01%.

In some aspects, the diluent makeup stream 272 can account for diluent losses during the process of regenerating the desiccant, for example via streams 278, 273, 241, or combinations thereof. In other aspects, the diluent makeup stream 272 can provide for an amount of diluent necessary to fill an off-line treater during the cooling phase of the regenerating cycle. The diluent for the diluent makeup stream can be provided by a diluent processing system. Excess diluent introduced to the treater regeneration system 70 during the cooling phase of the regenerating cycle can be returned to the diluent processing system, for example via stream 278 and 232, when the treater is drained.

Once the temperature of regeneration is reached in the off-line treater being regenerated, the off-line treater can enter a holding phase followed by the cooling phase; the off-line treater can enter directly to the cooling phase without a holding phase; or the off-line treater can enter into the cooling phase followed by a holding phase.

In the holding phase before the cooling phase, the temperature of the off-line treater being regenerated can be maintained at the temperature of regeneration for a period of time. For example, the temperature may be maintained for about 0.25, 0.5, 1, 2, 3, 4, 5, 6, 7, 8, 9, or more hours. During the holding phase, the regenerating medium may continue to pass though the desiccant and out of the off-line treater, or flow of the regenerating medium through the off-line treater can be stopped. In aspects of the holding phase which continue the flow of regenerating medium through the off-line treater, heating of the regenerating stream in vaporizer 73, cross exchanger 74, and electric heater 75 can continue in order to maintain the temperature of the off-line treater at the temperature of regeneration.

In an aspect, the cooling phase can comprise cooling the regenerating effluent stream 230 obtained from the off-line treater, such as the off-line treater 10, 15, 40, or 45, wherein the regenerating effluent stream comprises the regenerating medium. The regenerating effluent stream 230 can be cooled as previously described herein via the airfin cooler 77 and the cooling water condenser 78. The cooled regenerating effluent stream (e.g., stream 286) can be introduced to the decanter 71.

In an aspect, the regenerating effluent stream bypasses the crossflow exchanger 74 having the regenerating stream flowing therethrough during the cooling phase. During the cooling phase, the valve 283 is actuated to the open position, and the regenerating effluent stream 230 flows from the off-line treater 10, 15, 40, or 45 to the airfin cooler 77 via valve 283. As will be appreciated by one of skill in the art, and with the help of this disclosure, during the cooling phase, the regenerating stream does not need to be heated, and as such it is not necessary to send the regenerating effluent stream 230 to the cross exchanger 74 during the cooling phase, the regenerating effluent stream 230 is sent for cooling to the airfin cooler 77 via valve 283 that is actuated to the open position during the cooling phase of the regenerating cycle.

In an aspect, the cooling phase can comprise recycling the regenerating stream 276 comprising the regenerating medium from the decanter 71 to the off-line treater, such as the off-line treater 10, 15, 40, or 45. During the cooling phase, the decanter 71 can be maintained at a decanter operating pressure of about 100 psig (0.69 MPag) and at a decanter operating temperature of about 100° F. (37.8° C.) (e.g., ambient temperature).

In an aspect, the regenerating stream is not heated during the cooling phase. During the cooling phase, the vaporizer 73 is shut off, wherein the vaporizer 73 does not increase a temperature of the portion 279 of the stream 277, e.g., a temperature of stream 280 is substantially the same as a temperature of streams 276, 277, and 279 during the cooling phase (e.g., decanter operating temperature; ambient temperature; about 100° F. (37.8° C.)). Stream 279 can either flow through the shut-off vaporizer 73, or can bypass the shut-off vaporizer 73 and flow into stream 280.

During the cooling phase, the electric heater 75 is shut off, wherein the electric heater 75 does not increase a temperature of the stream 281, e.g., a temperature of stream 202 is substantially the same as a temperature of stream 281 during the cooling phase (e.g., ambient temperature; about 100° F. (37.8° C.)). Stream 281 can either flow through the shut-off electric heater 75, or can bypass the shut-off electric heater 75 and flow into stream 202.

During the cooling phase, a rate of flow of the regenerating medium through the off-line treater must be held low enough to insure no carryover of desiccant into regeneration system piping; e.g., a rate of flow of the regenerating medium through the off-line treater can be less than a fluidization velocity of the desiccant. In an aspect, during the cooling phase, the rate of flow of the regenerating medium through the off-line treater can be less than 90%, alternatively less than 80%, alternatively less than 75%, alternatively from 10% to 90%, alternatively from 20% to 80%, or alternatively from 25% to 75% of a fluidization velocity of the desiccant.

In an aspect, the cooling phase can comprise cooling the off-line treater, such as the off-line treater 10, 15, 40, or 45, to a temperature of about 150° F. (66° C.) with the regenerating medium (e.g., the regenerating medium contained in the regenerating stream). The regenerating stream (which, in FIG. 3, is the flow path defined by streams 276, 277, 279, 280, 281, and 202) is introduced to the off-line treater at a temperature that is substantially the same as the decanter operating temperature (e.g., ambient temperature; about 100° F. (37.8° C.)). During the cooling phase, the regenerating stream is not subjected to heat exchange between the decanter 71 and the off-line treater 10, 15, 40, or 45.

In an aspect, after the off-line treater cools to about 150° F. (66° C.), the off-line treater being regenerated can contain the regenerating medium (e.g., diluent) in a liquid phase. As will be appreciated by one of skill in the art, and with the help of this disclosure, and without wishing to be limited by theory, as portions of the desiccant in the off-line treater being regenerated fall below about 150° F. (66° C.), the diluent can remain in a liquid phase, thereby allowing the desiccant bed to be filled with liquid diluent. The liquid diluent can be removed from (e.g., drained from) the desiccant bed of the off-line treater being regenerated, as suitable for each type of off-line treater being regenerated.

In some aspects, the process of regenerating the desiccant can comprise a draining phase which follows the cooling phase. The draining phase can comprise (i) stopping a flow of the regenerating stream 202 to the off-line treater being regenerated, such as the off-line treater 10, 15, 40, or 45; and (ii) draining the regenerating medium (e.g., diluent) from the off-line treater to the decanter. As will be appreciated by one of skill in the art, and with the help of this disclosure, the off-line treaters are drained to remove the diluent from the off-line treater, prior to reintroducing the treater on-line, e.g., prior to introducing process streams to the treater for restoring the treater on-line.

In some aspects, pressure supply streams 14, 18, 44, or 48, having valves 13, 19, 43, or 49, respectively, can be used for introducing a pressurized gas (e.g., pressurized nitrogen) to the off-line treater 10, 15, 40, or 45, respectively. The pressurized gas can push the liquid phase regenerating medium from the off-line treater 10, 15, 40, or 45 to the decanter 71, for example via stream 288.

Stream 14 (e.g., a pressure supply stream) having appropriate valve 13 can be used for providing a pressure in the feed treater 10 during the draining phase effective for displacing the liquid diluent from the feed treater 10 into the decanter 71, for example via stream 288. Stream 18 (e.g., a pressure supply stream) having appropriate valve 19 can be used for providing a pressure in the feed treater 15 during the draining phase effective for displacing the liquid diluent from the feed treater 15 into the decanter 71, for example via stream 288. Stream 44 (e.g., a pressure supply stream) having appropriate valve 43 can be used for providing a pressure in the recycle treater 40 during the draining phase effective for displacing the liquid diluent from the recycle treater 40 into the decanter 71, for example via stream 288. Stream 48 (e.g., a pressure supply stream) having appropriate valve 49 can be used for providing a pressure in the recycle treater 45 during the draining phase effective for displacing the liquid diluent from the recycle treater 45 into the decanter 71, for example via stream 288.

A regenerating effluent stream flowing via stream 288 from the off-line treater 10, 15, 40, or 45 to the decanter 71 during the draining phase can be characterized by a temperature of from about 140° F. (60° C.) to about 150° F. (66° C.), or alternatively about 150° F. (66° C.).

After regeneration, the off-line treater can remain in stand-by mode until deemed necessary to return the treater online, or can be brought on-line without any stand-by, as previously described herein.

In some aspects, a closed loop diluent, as defined by a flow path of the regenerating stream (276, 279, 280, 281, 202) between the decanter and the treater, and by a flow path of the regenerating effluent stream (230, 282, 284, 286) between the treater and the decanter, can be employed during a heating phase and a cooling phase in polyolefin production systems, such as the polyolefin production system displayed in FIG. 2 (e.g., a polyethylene production system, for example for the production of HDPE). In such aspects, some polyolefin production systems can be configured for processing hexene (e.g., polyolefin production systems can include one or more hexene treaters). In such aspects, other polyolefin production systems may not be configured to process hexene (e.g., polyolefin production systems do not include a hexene treater). Nonlimiting examples of treaters in polyolefin production systems as disclosed herein include ethylene treaters, deethanizer overhead treaters, recycle isobutane treaters, olefin-free isobutane treaters, hexene treaters, and the like, or combinations thereof, wherein the treaters could be employed in full fractionation design facilities.

In an aspect, the off-line treater being regenerated can comprise an olefin-free isobutane treater, wherein the regenerating medium (e.g., diluent) can comprise olefin-free isobutane. The regenerating medium used to cooldown the olefin-free isobutane treater can comprise olefin-free isobutane, and as such the olefin-free isobutane (in a liquid phase) can remain in the treater at the end of the cooldown phase of the regeneration cycle. In some aspects, the olefin-free isobutane treater can be substantially full or nearly full with liquid olefin-free isobutane at the end of the cooldown phase of the regeneration cycle, wherein the end of the cooldown phase coincides with the olefin-free isobutane treater reaching a temperature of about 150° F. (66° C.). The olefin-free isobutane treater can be returned on-line by draining the liquid olefin-free isobutane to a decanter, such as decanter 71, as previously described herein, followed by introducing an olefin-free isobutane stream to be treated to the olefin-free isobutane treater.

In an aspect, the off-line treater being regenerated can comprise an ethylene treater, wherein the regenerating medium (e.g., diluent) comprises isobutane. The regenerating medium used to cooldown the ethylene treater can comprise isobutane, and as such the isobutane (in a liquid phase) can remain in the treater at the end of the cooldown phase of the regeneration cycle. In some aspects, the ethylene treater can be substantially full or nearly full with liquid isobutane at the end of the cooldown phase of the regeneration cycle, wherein the end of the cooldown phase coincides with the ethylene treater reaching a temperature of about 150° F. (66° C.). The isobutane in the ethylene treater can be drained to the decanter while a temperature of the draining isobutane is from about 140° F. (60° C.) to about 150° F. (66° C.), which temperature can enable draining by vapor pressure of the isobutane in the ethylene treater. Subsequent to the draining phase (e.g., draining the isobutane from the ethylene treater), the desiccant can remain wet with isobutane, for example in desiccant pores, which can substantially eliminate or reduce a need for pre-loading desiccant pores prior to introducing an ethylene stream to the ethylene treater, when returning the ethylene treater online. An excess of isobutane in the decanter that was used to fill the treater during the regeneration cycle can be returned to processing by using the decanter level control, as disclosed herein.

During the draining phase for an ethylene treater, a treater inlet for the regenerating stream can be closed, for example via a valve, and a bottom treater outlet manifold can be open and connected to a regenerating effluent stream return line to the decanter, for example to allow for a pressure differential between hot isobutane in the ethylene treater (from about 140° F. (60° C.) to about 150° F. (66° C.)) and cold isobutane (about 100° F. (37.8° C.)) in the decanter to drain the liquid isobutane from the treater into the decanter. If necessary, ethylene can be introduced to the ethylene treater to increase the pressure in the treater and push the liquid isobutane out of the treater and into the decanter, provided that a liquid trap is used to prevent blow through of ethylene into the decanter.

In some aspects, the ethylene treater can be cooled with once-through nitrogen during the cooling phase. For purposes of the disclosure herein the term "once-through nitrogen" means that the nitrogen is not in a circulation loop, and flows into and out of the off-line treater only once in continuous flow. The ethylene treater can be cooled to ambient temperature with once-through nitrogen during the cooling phase, which can advantageously avoid introducing liquid or condensed diluent (e.g., isobutane) to a vapor service treater, such as the ethylene treater.

In an aspect, the off-line treater being regenerated can comprise a deethanizer overhead treater, wherein the regenerating medium (e.g., diluent) comprises isobutane. The regenerating medium used to cooldown the deethanizer overhead treater can comprise isobutane, and as such the isobutane (in a liquid phase) can remain in the treater at the end of the cooldown phase of the regeneration cycle. In some aspects, the deethanizer overhead treater can be substantially full or nearly full with liquid isobutane at the end of the cooldown phase of the regeneration cycle, wherein the end of the cooldown phase coincides with the deethanizer overhead treater reaching a temperature of about 150° F. (66° C.). The isobutane in the deethanizer overhead treater can be drained to the decanter while a temperature of the draining isobutane is from about 140° F. (60° C.) to about 150° F. (66° C.), which temperature can enable draining by vapor pressure of the isobutane in the deethanizer overhead treater. Subsequent to the draining phase (e.g., draining the isobutane from the deethanizer overhead treater), the desiccant can remain wet with isobutane, for example in desiccant pores, which can substantially eliminate or reduce a need for pre-loading desiccant pores prior to introducing a deethanizer overhead stream to the deethanizer overhead treater, when returning the deethanizer overhead treater online.

During the draining phase for a deethanizer overhead treater, a treater inlet for the regenerating stream can be closed, for example via a valve, and a bottom treater outlet manifold can be open and connected to a regenerating effluent stream return line to the decanter, for example to allow for a pressure differential between hot isobutane in the deethanizer overhead treater (from about 140° F. (60° C.) to about 150° F. (66° C.)) and cold isobutane (about 100° F. (37.8° C.)) in the decanter to drain the liquid isobutane from the treater into the decanter. In some aspects, isobutane remaining in the deethanizer overhead treater subsequent to the draining phase (e.g., in desiccant pores) can flow out of the deethanizer overhead treater when the treater is returned to service, for example via a vent column bottoms drum provided in the deethanizer overhead treater configuration. In other aspects, isobutane remaining in the deethanizer overhead treater subsequent to the draining phase (e.g., in desiccant pores) can flow out of the deethanizer overhead treater via liquid traps provided in a treater outlet manifold, which liquid traps can return the liquid isobutane to a deethanizer column accumulator.

While the current disclosure is discussed in detail in the context of the treater regeneration system 70 being part of a polyolefin production system, such as the polyolefin production system displayed in FIG. 2, it should be understood that the treater regeneration system 70 as displayed in FIG. 3 can be used for the regeneration of any suitable treater, whether the treater is part or not of a polyolefin production system. For example, the treater regeneration system 70 as displayed in FIG. 3 can be used for the regeneration of a deethanizer overhead treater.

In some aspects, the deethanizer overhead treater can be cooled with once-through nitrogen during the cooling phase. The deethanizer overhead treater can be cooled to ambient temperature with once-through nitrogen during the cooling phase, which can advantageously avoid introducing liquid or condensed diluent (e.g., isobutane) to a vapor service treater, such as the deethanizer overhead treater.

In an aspect, hexene treaters, recycle isobutane treaters in direct recycle plants, or both can be regenerated using once-through nitrogen during the heating phase; followed by isobutane cooling during the cooling phase.

The hexene treater, the recycle isobutane treater in direct recycle plants, or both have the potential to contain hexene range ($C_6$ range) oxygenates (e.g., ketones, carbonyls, hexyl hydroperoxide, etc.), which oxygenates can contaminate the fresh hexene system after treater regeneration. As will be appreciated by one of skill in the art, and with the help of this disclosure, $C_6$ range materials can often be transported under an air cap, leading to formation of $C_6$ oxygenates. $C_6$ range oxygenates cannot be effectively rejected by fractionation systems because of having a close boiling point to 1-hexene.

In order to prevent buildup of $C_6$ range contaminants, such as $C_6$ range oxygenates, hexene treaters, recycle isobutane treaters in direct recycle plants, or both can be regenerated and held at a maximum temperature of regeneration with fresh nitrogen on a once through basis. In some aspects, fresh nitrogen rates can be minimized in order to reduce flare loads.

While the current disclosure is discussed in detail in the context of the heating phase employing a regenerating medium comprising a diluent, it should be understood that any suitable regenerating medium can be used during the heating phase, provided that the regenerating medium is compatible with the materials and methods disclosed herein.

In some aspects, the regenerating medium during the heating phase can comprise nitrogen, for example in a hexene treater, recycle isobutane treater in direct recycle plants, or both.

In an aspect, the off-line treater being regenerated can comprise a hexene treater, wherein the regenerating cycle for the hexene treater can comprise a holding phase between the heating phase and the cooling phase, wherein holding phase comprises maintaining the off-line treater at the temperature in the range of 400° F. (204° C.) to 600° F. (316° C.), alternatively 425° F. (218° C.) to 575° F. (302° C.), or alternatively 450° F. (232° C.) to 550° F. (288° C.), using nitrogen on a once-through basis. In such aspect, the temperature can be maintained during the holding phase for a period of time of equal to or greater than about 0.25 hours, 0.5 hours, 1 hour, 2 hours, 3 hours, 4 hours, 5 hours, 6 hours, or more. In some aspects, the temperature can be maintained during the holding phase for a period of time of about 2 hours.

In an aspect, the off-line treater being regenerated can comprise a hexene treater, wherein the regenerating medium (e.g., diluent) employed during the cooling phase comprises isobutane. The regenerating medium used to cooldown the hexene treater comprises isobutane, and as such the isobutane (in a liquid phase) remains in the treater at the end of the cooldown phase of the regeneration cycle. In some aspects, the hexene treater can be substantially full or nearly full with liquid isobutane at the end of the cooldown phase of the regeneration cycle, wherein the end of the cooldown phase coincides with the hexene treater reaching a temperature of about 150° F. (66° C.). The isobutane in the hexene treater can be drained to the decanter while a temperature of the draining isobutane is from about 140° F. (60° C.) to about 150° F. (66° C.), which temperature can enable draining by vapor pressure of the isobutane in the hexene treater. Subsequent to the draining phase (e.g., draining the isobutane from the hexene treater), the desiccant can remain wet with isobutane, for example in desiccant pores, which can substantially eliminate or reduce a need for pre-loading desiccant pores prior to introducing a hexene stream to the hexene treater, when returning the hexene treater online. An excess of isobutane in the decanter that was used to fill the hexene treater during the cooling phase of the regeneration cycle can be returned to processing by using the decanter level control, as disclosed herein.

During the draining phase for a hexene treater, a treater inlet for the regenerating stream can be closed, for example via a valve, and a bottom treater outlet manifold can be open and connected to a regenerating effluent stream return line to the decanter, for example to allow for a pressure differential between hot isobutane in the hexene treater (from about 140° F. (60° C.) to about 150° F. (66° C.)) and cold isobutane (about 100° F. (37.8° C.)) in the decanter to drain the liquid isobutane from the treater into the decanter. Any residual isobutane that remains in the hexene treater subsequent to the draining phase can be sent to a reactor in a polymerization system, e.g., polymerization zone 20, when the hexene treater is returned on-line. Switching online the newly regenerated recycle isobutane treater can be done slowly to minimize any composition upset on a reactor in a polymerization system, e.g., polymerization zone 20.

In an aspect, the off-line treater being regenerated can comprise a recycle isobutane treater, wherein the regenerating medium (e.g., diluent) employed during the cooling phase comprises isobutane. The regenerating medium used to cooldown the recycle treater comprises isobutane, and as such the isobutane (in a liquid phase) remains in the treater at the end of the cooldown phase of the regeneration cycle. In some aspects, the recycle isobutane treater can be substantially full or nearly full with liquid isobutane at the end of the cooldown phase of the regeneration cycle, wherein the end of the cooldown phase coincides with the recycle isobutane treater reaching a temperature of about 150° F. (66° C.). The recycle isobutane treater can be returned on-line by draining the liquid isobutane to a decanter, such as decanter 71, as previously described herein; followed by slowly switching online the newly regenerated recycle isobutane treater to minimize any composition upset on a reactor in a polymerization system, e.g., polymerization zone 20. As will be appreciated by one of skill in the art, and with the help of this disclosure, an ethylene concentration in a recycle isobutane stream may change significantly if the recycle isobutane treater is placed in service too quickly following a regeneration cycle.

The disclosed systems, processes, or both can advantageously display improvements in one or more system characteristics, process characteristics, or both when compared to otherwise similar systems, processes, or both used in conventional treater regeneration processes. The method of regenerating a desiccant in an off-line treater of a polyolefin production process as disclosed herein can advantageously allow for reduced emissions when compared to conventional once-through nitrogen regeneration systems, nitrogen recycle regeneration systems, or both. Sometimes, spent nitrogen sent to flare in conventional nitrogen regeneration systems, nitrogen recycle regeneration systems, or both is enriched, and as such the nitrogen flare can create emissions, such as $CO_2$, carbon monoxide (CO), nitrogen oxides ($NO_x$), and the like, or combinations thereof.

The method of regenerating a desiccant in an off-line treater of a polyolefin production process as disclosed herein can advantageously reduce nitrogen for treater regeneration by equal to or greater than 90%, alternatively by equal to or greater than 95%, or alternatively by equal to or greater than 99%, when compared to conventional once-through nitrogen regeneration systems, nitrogen recycle regeneration systems, or both. Additional advantages of the systems, processes, or both for regenerating a desiccant in an off-line treater of a polyolefin production process as disclosed herein can be apparent to one of skill in the art viewing this disclosure.

Additional Description

Embodiments of methods for treater regeneration have been described. The following are a first set of nonlimiting, specific embodiments in accordance with the present disclosure:

Embodiment 1 is a method of regenerating a desiccant in an off-line treater of a polyolefin production process, the method comprising a heating phase followed by a cooling phase, the heating phase comprising treating a recycle stream of the polyolefin production process in an on-line treater to yield a treated recycle stream; heating at least a portion of the treated recycle stream to yield a regenerating gas; regenerating at least a portion of the desiccant in the off-line treater using the regenerating gas to yield a regenerating effluent stream; separating the regenerating effluent stream into an impurity stream and a regenerating recycle stream; and recycling the regenerating recycle stream to the on-line treater.

Embodiment 2 is the method of embodiment 1, the cooling phase comprising thermosyphoning the regenerating gas, nitrogen, or both in a closed-convection loop of the off-line treater to cool the off-line treater to a temperature in the range of 150° F. (66° C.) to 400° F. (204° C.).

Embodiment 3 is the method of embodiment 2, wherein the closed-convection loop comprises a finned air cooler.

Embodiment 4 is the method of embodiment 1, the cooling phase comprising thermosyphoning the regenerating gas, nitrogen, or both in a closed-convection loop of the off-line treater to cool the off-line treater to a first temperature of about 350° F. (about 177° C.); and thermosyphoning an olefin-free diluent in the closed-convection loop of the off-line treater to cool the off-line treater from the first temperature to a second temperature of about 150° F. (about 66° C.).

Embodiment 5 is the method of embodiment 4, wherein the closed-convection loop comprises a finned air cooler.

Embodiment 6 is the method of any of embodiments 1 to 5, wherein the off-line treater reaches a temperature in the range of 400° F. to (204° C.) to 600° F. (316° C.) during the heating phase.

Embodiment 7 is the method of any of embodiments 1 to 6, wherein the step of regenerating comprises introducing the regenerating gas into the off-line treater; and removing an impurity from the desiccant of the off-line treater with the regenerating gas.

Embodiment 8 is the method of any of embodiments 1 to 7, wherein the step of separating comprises condensing the regenerating effluent stream to yield the impurity stream and the regenerating recycle stream.

Embodiment 9 is the method of any of embodiments 1 to 8, wherein the recycle stream of the polyolefin production process, the treated recycle stream, the regenerating gas, the regenerating effluent stream, and the regenerating recycle stream each comprise one or more compounds selected from the group consisting of diluent, unreacted monomer, unreacted comonomer, and combinations thereof.

Embodiment 10 is the method of any of embodiments 1 to 9, wherein the regenerating gas and the regenerating effluent stream comprise diluent in a gaseous phase.

Embodiment 11 is the method of any of embodiments 1 to 10, wherein the recycle stream, the treated recycle stream, and the regenerating recycle stream comprise diluent in a liquid phase.

Embodiment 12 is the method of any of embodiments 1 to 11, wherein the diluent is propane, butane, isobutane, pentane, isopentane, hexane, heptane, or combinations thereof.

Embodiment 13 is the method of any of embodiments 1 to 12, wherein the unreacted monomer is ethylene, propylene, octene (e.g., 1-octene), or combinations thereof.

Embodiment 14 is the method of any of embodiments 1 to 13, wherein the unreacted comonomer is hexene, butene, or combinations thereof.

Embodiment 15 is the method of any of embodiments 1 to 14, wherein the desiccant is arranged in one or more desiccant beds in the off-line treater.

Embodiment 16 is the method of embodiment 15, wherein the one or more desiccant beds are selected from molecular sieve, activated alumina, silica gel, montmorillonite clay, calcium oxide, calcium sulfate, calcium chloride, activated carbon, metal salts, phosphorus-containing desiccant compounds, or combinations thereof.

Embodiment 17 is the method of embodiment 16, wherein the one or more desiccant beds comprise a molecular sieve having a pore size of 10 angstroms or more.

Embodiment 18 is the method of any of embodiments 1 to 17, wherein the polyolefin production process comprises from 2 to 40 treaters.

Embodiment 19 is the method of embodiment 18, wherein each treater comprises from 1 to 30 desiccant beds.

Embodiment 20 is the method of any of embodiments 18 to 19, wherein each treater is a feed treater or a recycle treater.

Embodiment 21 is a method of regenerating a desiccant in an off-line treater of a polyolefin production process, the method comprising a heating phase followed by a cooling phase, the cooling phase comprising thermosyphoning a regenerating gas, nitrogen, an olefin-free diluent, or combinations thereof in a closed-convection loop of the off-line treater to cool the off-line treater to a temperature in the range of from 150° F. (66° C.) to 400° F. (204° C.).

Embodiment 22 is the method of embodiment 21, wherein the step of thermosyphoning comprises thermosyphoning the regenerating gas, nitrogen, or both in the closed-convection loop of the off-line treater to cool the off-line treater to a first temperature of about 350° F. (about 177° C.); and thermosyphoning the olefin-free diluent in the closed-convection loop of the off-line treater to cool the off-line treater from the first temperature to a second temperature of about 150° F. (about 66° C.).

Embodiment 23 is the method of any of embodiments 21 to 22, wherein the closed-convection loop comprises a finned air cooler.

Embodiment 24 is the method of any of embodiments 21 to 23, wherein the regenerating gas is obtained by treating a recycle stream of the polyolefin production process in an on-line treater to yield a treated recycle stream; heating at least a portion of the treated recycle stream to yield the regenerating gas; and introducing the regenerating gas to the off-line treater.

Embodiment 25 is the method of any of embodiments 21 to 24, further comprising maintaining a pressure of the off-line treater during the step of thermosyphoning.

Embodiment 26 is the method of any of embodiments 21 to 25, wherein the off-line treater reaches a temperature in the range of 400° F. (204° C.) to 600° F. (316° C.) during the heating phase.

Embodiment 27 is the method of any of embodiments 21 to 26, further comprising a holding phase between the heating phase and the cooling phase, wherein holding phase comprises maintaining the off-line treater at the temperature in the range of 400° F. (204° C.) to 600° F. (316° C.).

Embodiment 28 is the method of any of embodiments 21 to 27, wherein a recycle stream of the polyolefin production process, the treated recycle stream, the regenerating gas, a regenerating effluent stream, and a regenerating recycle stream each comprise one or more compounds selected from the group consisting of diluent, unreacted monomer, unreacted comonomer, and combinations thereof.

Embodiment 29 is the method of embodiment 28, wherein the regenerating gas and the regenerating effluent stream comprise diluent in a gaseous phase.

Embodiment 30 is the method of any of embodiments 28 to 29, wherein the recycle stream, the treated recycle stream, and the regenerating recycle stream comprise diluent in a liquid phase.

Embodiment 31 is the method of any of embodiments 21 to 30, wherein the diluent is propane, butane, isobutane, pentane, isopentane, hexane, heptane, or combinations thereof.

Embodiment 32 is the method of any of embodiments 28 to 31, wherein the unreacted monomer is ethylene, propylene, octene (e.g., 1-octene), or combinations thereof.

Embodiment 33 is the method of any of embodiments 28 to 32, wherein the unreacted comonomer is hexene, butene, or combinations thereof.

Embodiment 34 is the method of any of embodiments 21 to 33, wherein the desiccant is arranged in one or more desiccant beds in the off-line treater.

Embodiment 35 is the method of embodiment 34, wherein the one or more desiccant beds are selected from molecular sieve, activated alumina, silica gel, montmorillonite clay, calcium oxide, calcium sulfate, calcium chloride, activated carbon, metal salts, phosphorus-containing desiccant compounds, or combinations thereof.

Embodiment 36 is the method of embodiment 35, wherein the one or more desiccant beds comprise a molecular sieve having a pore size of 10 angstroms or more.

Embodiment 37 is the method of any of embodiments 21 to 36, wherein the polyolefin production process comprises from 2 to 40 treaters.

Embodiment 38 is the method of embodiment 37, wherein each treater comprises from 1 to 30 desiccant beds.

Embodiment 39 is the method of any of embodiments 37 to 38, wherein each treater is a feed treater or a recycle treater.

A first aspect, which is a method of regenerating a desiccant in an off-line treater of a polyolefin production process, the method comprising a heating phase followed by a cooling phase, the heating phase comprising heating a regenerating stream comprising a regenerating medium; regenerating at least a portion of the desiccant in the off-line treater using the regenerating medium to yield a regenerating effluent stream comprising the regenerating medium, water, and an impurity; and decanting the regenerating effluent stream into a water stream comprising the water and the regenerating stream.

A second aspect, which is the method of the first aspect, the heating phase further comprising separating a portion of the regenerating stream into an impurity stream comprising the impurity and a process recycle stream comprising the regenerating medium.

A third aspect, which is the method of the second aspect, wherein the portion of the regenerating stream comprises about 10% of the regenerating stream based on a total flow rate of the regenerating stream.

A fourth aspect, which is the method of any of the first through the third aspects, wherein the impurity is carbon dioxide.

A fifth aspect, which is the method of any one of the first through the fourth aspects, the heating phase further comprising prior to decanting, cooling the regenerating effluent stream.

A sixth aspect, which is the method of the fifth aspect, wherein the step of cooling in the heating phase comprises cooling the regenerating effluent stream in a cross exchanger and then in an airfin cooler to a first temperature of about 150° F. (66° C.), wherein the cross exchanger uses the regenerating stream to cool the regenerating effluent stream; and cooling the regenerating effluent stream in a cooling water condenser from the first temperature to a second temperature of about 100° F. (37.8° C.), wherein a pressure of the regenerating effluent stream at the second temperature is about 100 psig (0.69 MPag).

A seventh aspect, which is the method of any one of the first through the sixth aspects, wherein the step of heating in the heating phase comprises heating the at least a portion of the regenerating stream in a vaporizer to a first temperature of about 146° F. (63.3° C.); heating the at least a portion of the regenerating stream in a cross exchanger to a second temperature, wherein the cross exchanger uses the regenerating effluent stream to heat the regenerating stream to the second temperature which is within about 20° F. (11.1° C.) of a temperature of the regenerating effluent stream; and heating the at least a portion of the regenerating stream in an electric heater to a third temperature in the range of 400° F. (204° C.) to 600° F. (316° C.).

An eighth aspect, which is the method of any one of the first through the seventh aspects, wherein the off-line treater reaches a temperature in the range of 400° F. (204° C.) to 600° F. (316° C.) during the heating phase.

A ninth aspect, which is the method of any one of the first through the seventh aspects, wherein during the heating phase the off-line treater has a temperature of about 150° F. (66° C.) or lower, and wherein during the heating phase a rate of flow of the regenerating medium through the off-line treater is from about 2% to about 75% of a fluidization velocity of the desiccant.

A tenth aspect, which is the method of any one of the first through the ninth aspects, wherein the step of regenerating in the heating phase comprises introducing the regenerating medium into the off-line treater; and removing the impurity from the desiccant of the off-line treater with the regenerating medium.

An eleventh aspect, which is the method of any one of the first through the tenth aspects, wherein the regenerating medium comprises diluent in a liquid phase, diluent in a gaseous phase, or diluent in both a liquid phase and a gaseous phase.

A twelfth aspect, which is the method of the eleventh aspect, wherein the diluent is propane, butane, isobutane, pentane, isopentane, hexane, heptane, or combinations thereof.

A thirteenth aspect, which is a method of regenerating a desiccant in an off-line treater of a polyolefin production process, the method comprising a heating phase followed by a cooling phase, the cooling phase comprising cooling a regenerating effluent stream obtained from the off-line treater, wherein the regenerating effluent stream comprises a regenerating medium; recycling a regenerating stream comprising the regenerating medium from a decanter to the off-line treater; and cooling the off-line treater to a temperature of about 150° F. (66° C.) with the regenerating medium.

A fourteenth aspect, which is the method of the thirteenth aspect, wherein the decanter is maintained at a temperature of about 100° F. (37.8° C.) and a pressure of about 100 psig (0.69 MPag) during the cooling phase.

A fifteenth aspect, which is the method of any one of the thirteenth and the fourteenth aspects, wherein the regenerating stream is not heated during the cooling phase, and wherein the regenerating effluent stream bypasses a cross-flow exchanger having the regenerating stream flowing therethrough during the cooling phase.

A sixteenth aspect, which is the method of any one of the thirteenth through the fifteenth aspects, wherein after the off-line treater cools to about 150° F. (66° C.), the off-line treater contains the regenerating medium in a liquid phase.

A seventeenth aspect, which is the method of the sixteenth aspect, further comprising a draining phase which follows the cooling phase, wherein the draining phase comprises stopping a flow of the regenerating stream to the off-line treater; and draining the regenerating medium from the off-line treater to the decanter.

An eighteenth aspect, which is the method of the seventeenth aspect, wherein a temperature of the regenerating effluent stream is from about 140° F. (60° C.) to about 150° F. (66° C.) during the step of draining in the cooling phase.

A nineteenth aspect, which is the method of any one of the thirteenth through the eighteenth aspects, wherein the off-line treater comprises an ethylene treater, a hexene treater, an isobutane treater, an isopentane treater, a pentane treater, or a deethanizer column overhead treater.

A twentieth aspect, which is the method of the thirteenth aspect, wherein the off-line treater is a hexene treater, the method further comprising a holding phase between the heating phase and the cooling phase, wherein holding phase comprises maintaining the off-line treater at the temperature in the range of 400° F. (204° C.) to 600° F. (316° C.) using nitrogen on a once-through basis.

A twenty-first aspect, which is a method of regenerating a desiccant in an off-line treater of a polyolefin production process, the method comprising a heating phase followed by a cooling phase, the heating phase comprising heating a regenerating stream comprising a regenerating medium; regenerating at least a portion of the desiccant in the off-line treater using the regenerating medium to yield a regenerating effluent stream comprising the regenerating medium and water; and decanting in a decanter the regenerating effluent stream into a water stream comprising the water and the regenerating stream comprising the regenerating medium; the cooling phase comprising cooling the regenerating effluent stream obtained from the off-line treater; recycling the regenerating stream from the decanter to the off-line treater; and cooling the off-line treater with the regenerating medium obtained from the decanter.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The discussion of a reference in the disclosure is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

We claim:

1. A treater regeneration system in a polyolefin production system, the treater regeneration system comprising:
   an off-line treater receiving a first portion of a regenerating stream and regenerating a desiccant in the off-line treater to yield a regenerating effluent stream, wherein the regenerating stream comprises a regenerating medium, and wherein the regenerating effluent stream comprises the regenerating medium, water and an impurity;
   a decanter receiving at least a portion of the regenerating effluent stream to yield the regenerating stream and a water stream, wherein the water stream comprises the water; and
   a stripper receiving a second portion of the regenerating stream to yield an impurity stream and a process recycle stream, wherein the impurity stream comprises at least a portion of the impurity, and wherein the process recycle stream comprises the regenerating medium of the second portion of the regenerating stream.

2. The treater regeneration system of claim 1 further comprising a pump configured to withdraw the regenerating stream from the decanter.

3. The treater regeneration system of claim 2, wherein the pump is a low head centrifugal pump.

4. The treater regeneration system of claim 2, wherein the pump is equipped with a minimum flow protection loop.

5. The treater regeneration system of claim 1, wherein the decanter is configured to operate at a pressure of less than a regenerating medium critical pressure.

6. The treater regeneration system of claim 1, wherein the decanter comprises a phase separation compartment and a diluent compartment separated by a substantially vertical divider baffle, wherein the regenerating effluent stream phase separates in the phase separation compartment into a top regenerating medium layer and a bottom aqueous layer, and wherein at least a portion of the top regenerating medium layer flows over the divider baffle into the diluent compartment.

7. The treater regeneration system of claim 6, wherein the phase separation compartment is characterized by a phase separation compartment residence time, wherein the diluent compartment is characterized by a diluent compartment residence time, and wherein the phase separation compartment residence time is greater than the diluent compartment residence time.

8. The treater regeneration system of claim 7, wherein the phase separation compartment residence time is from about 1 minute to about 60 minutes.

9. The treater regeneration system of claim 7, wherein the diluent compartment residence time is from about 1 minute to about 30 minutes.

10. The treater regeneration system of claim 6, wherein the phase separation compartment further comprises a water boot located at a bottom of the decanter, wherein the water boot is characterized by a length to diameter (L/D) ratio of from about 1.5:1 to about 2.5:1; and wherein the water stream is recovered from the decanter via the water boot.

11. The treater regeneration system of claim 10, wherein the water boot is characterized by a volume that is from about 10 vol. % to about 25 vol. %, based on the expected maximum water volume at normal water level in the decanter.

12. The treater regeneration system of claim 11 further comprising a conductivity monitor configured to monitor the conductivity of the fluids discharged through the water boot and via the water stream, wherein a decrease in conductivity indicates contamination of the water stream with the regenerating medium.

13. The treater regeneration system of claim 12, wherein the water boot further comprises one or more drain valves allowing for discharging of the water stream, and wherein the one or more drain valves are actuated to a closed position when the conductivity monitor senses a decrease in conductivity.

14. The treater regeneration system of claim 1, wherein the decanter further comprises a pressure controlled vent to flare.

15. The treater regeneration system of claim 1 further comprising:
   a vaporizer receiving the first portion of the regenerating stream from the decanter at ambient temperature and heating the first portion of the regenerating stream to a temperature of from about 135° F. (57.2° C.) to about 155° F. (68.3° C.);
   a crossexchanger optionally receiving the first portion of the regenerating stream from the vaporizer and heating the first portion of the regenerating stream using the regenerating effluent stream to a temperature within about 30° F. (16.7° C.) of a temperature of the regenerating effluent stream; and
   an electric heater receiving the first portion of the regenerating stream from the crossexchanger or from the vaporizer and further heating the first portion of the regenerating stream to a temperature of from about 400° F. (204° C.) to about 600° F. (316° C.).

16. The treater regeneration system of claim 1 further comprising:
   a crossexchanger optionally receiving the regenerating effluent stream from the off-line treater and cooling the regenerating effluent stream using the first portion of the regenerating stream;
   an airfin cooler receiving the regenerating effluent stream from the off-line treater or the crossexchanger and cooling the regenerating effluent stream to temperature of from about 125° F. (51.7° C.) to about 175° F. (79.4° C.); and
   a cooling water condenser receiving the regenerating effluent stream from the airfin cooler and cooling the regenerating effluent stream to a decanter operating temperature.

17. The treater regeneration system of claim 1, wherein the off-line treater is characterized by a regeneration temperature of from about 400° F. (204° C.) to about 600° F. (316° C.), and wherein the off-line treater is maintained at the regeneration temperature during a holding phase for a period of time of 0.25 hours to 9 hours or more.

18. The treater regeneration system of claim 1, wherein the polyolefin production system further comprises an on-line treater receiving at least a portion of the process recycle stream and a recycle stream from one or more polymerization zones to yield a treated recycle stream, wherein the recycle stream comprises the impurity and a diluent, and wherein the treated recycle stream comprises the diluent.

19. The treater regeneration system of claim 18, wherein the treated recycle stream further comprises the impurity in an amount of less than about 200 ppm, and wherein an amount of impurity in the treated recycle stream is less than an amount of impurity in the recycle stream.

20. The treater regeneration system of claim 18, wherein the one or more polymerization zones comprises at least two polymerization zones operating in parallel, at least two polymerization zones operating in series, or combinations thereof.

21. A polyolefin production system comprising:
   one or more polymerization zones receiving a monomer and a diluent to produce a polymerization zone effluent stream comprising a polyolefin, the diluent, and an impurity;
   a product recovery system receiving the polymerization zone effluent stream to yield the polyolefin and a recycle stream comprising the diluent and the impurity;
   an on-line treater treating the recycle stream and a process recycle stream to yield a treated recycle stream, wherein the treated recycle stream comprises the diluent;
   an off-line treater receiving a first portion of a regenerating stream and regenerating a desiccant in the off-line treater to yield a regenerating effluent stream, wherein the regenerating stream comprises the diluent, and wherein the regenerating effluent stream comprises the diluent, water and the impurity;
   a decanter receiving at least a portion of the regenerating effluent stream to yield the regenerating stream and a water stream, wherein the water stream comprises the water; and
   a stripper receiving a second portion of the regenerating stream to yield an impurity stream and the process recycle stream, wherein the impurity stream comprises at least a portion of the impurity, and wherein the process recycle stream comprises the diluent of the second portion of the regenerating stream.

22. The polyolefin production system of claim 21, wherein the diluent comprises isobutane, and wherein the impurity comprises carbon dioxide ($CO_2$).

23. The polyolefin production system of claim 21, wherein the second portion of the regenerating stream is from about from about 1% to about 20% of the regenerating stream, based on a total flow rate of the regenerating stream.

* * * * *